United States Patent
Zhang et al.

(10) Patent No.: US 12,283,729 B2
(45) Date of Patent: Apr. 22, 2025

(54) ANION EXCHANGE BRANCHED CO-POLYMER WITH POLY(ARYL) AND A BRANCHED COMPOUND AND QUINUCLIDINIUM SIDE CHAINS AND SYNTHESIS THEREOF

(71) Applicant: USA Fortescue IP, INC., Wilmington, DE (US)

(72) Inventors: Qiuying Zhang, Fairfax, VA (US);
Mengjie Chen, Seaford, DE (US);
Bamdad Bahar, Georgetown, DE (US);
Sarah Toombs, Stafford, VA (US);
Benjamin Kredensor, Manassas Park, VA (US)

( * ) Notice: Subject to any disclaimer, the term of this patent is extended or adjusted under 35 U.S.C. 154(b) by 0 days.

(21) Appl. No.: 18/927,474

(22) Filed: Oct. 25, 2024

(65) Prior Publication Data
US 2025/0062377 A1    Feb. 20, 2025

Related U.S. Application Data

(63) Continuation of application No. PCT/US2024/024460, filed on Apr. 12, 2024.

(60) Provisional application No. 63/562,416, filed on Mar. 7, 2024, provisional application No. 63/627,787, filed on Jan. 31, 2024, provisional application No. 63/616,542, filed on Dec. 30, 2023, provisional application No. 63/532,235, filed on Aug. 11, 2023, provisional application No. 63/531,026, filed on Aug. 7, 2023, provisional application No. 63/472,987, filed on Jun. 14, 2023, provisional application No. 63/458,907, filed on Apr. 12, 2023.

(51) Int. Cl.
*H01M 8/1023* (2016.01)
*B01D 61/42* (2006.01)
*H01M 8/10* (2016.01)
*H01M 8/1025* (2016.01)
*H01M 8/103* (2016.01)

(52) U.S. Cl.
CPC ........ *H01M 8/1023* (2013.01); *B01D 61/422* (2013.01); *H01M 8/1025* (2013.01); *H01M 8/103* (2013.01); *H01M 2008/1095* (2013.01)

(58) Field of Classification Search
CPC .. H01M 8/1023; H01M 8/1025; H01M 8/103; H01M 2008/1095; B01D 61/422
USPC ............................................. 521/25
See application file for complete search history.

(56) References Cited

U.S. PATENT DOCUMENTS

| 4,126,589 | A | * | 11/1978 | Hamada | C08J 5/225 |
|---|---|---|---|---|---|
| | | | | | 521/31 |
| 9,580,824 | B2 | * | 2/2017 | Masel | C25B 1/04 |
| 2015/0307659 | A1 | * | 10/2015 | Hong | H01M 8/20 |
| | | | | | 429/492 |

FOREIGN PATENT DOCUMENTS

CN    105566884 A  *  5/2016

OTHER PUBLICATIONS

Allushi et al. ". "Ether-free polyfluorenes tethered with quinuclidinium cations as hydroxide exchange", J. Mater. Chem. A, 2019, 7, pp. 27164-27174. (Year: 2019).*
Dong Pan et al. "Alkali-Stable Anion Exchange Membranes Based on Poly(xanthene)", ASC Publications Macro Letters., 2023, 12, pp. 20-25 (Year: 2023).*
Mayadevi et al. "Poly(meta/para-Terphenylene-Methyl Piperidinium)-Based Anion Exchange Membranes: The Effect of Backbone Structure in AEMEC Application", Membranes, 2020, 10, 329 (Year: 2020).*
Chen et al. "Poly(fluorenyl aryl piperidinium) membranes and ionomers for anion exchange membrane fuel cells", Nature Communications, vol. 12, (2021), Article No. 2367. (Year: 2021).*
Allushi, A. et el., J. Mater. Chem. A, 2019, vol. 7, pp. 27164-27174.
Pan, D. et al., ACS Macro Lett., Dec. 20, 2022, vol. 12, pp. 20-25.
Chen, N. et al., Natural communication, Apr. 22, 2021, vol. 12, Article No. 2367, internal pp. 1-11.
Mayadevi, T. S. et al., Membranes, Nov. 5, 2020, vol. 10, No. 11, Article No. 329, internal pp. 1-16.

* cited by examiner

*Primary Examiner* — Michael M. Bernshteyn
(74) *Attorney, Agent, or Firm* — Invention To Patent Services; Alex Hobson

(57) ABSTRACT

An anion exchange branched co-polymer includes poly (aryl) and a branched compound and quinuclininuium side chains. The co-polymer may include xanthene or bibenzofuran. The anion exchange branched co-polymer may be more durable and have less creep and may have a higher ion exchange capacity (IEC) due to the structure and because some of the side chains may have multiple functional sites. The co-polymer may be cross-linked and may also include free radical inhibitors. The co-polymer may be incorporated into a support material and used in an anion exchange membrane or membrane electrode assembly.

24 Claims, 15 Drawing Sheets

ANION EXCHANGE BRANCHED CO-POLYMER WITH POLY(ARYL) AND A BRANCHED COMPOUND AND QUINUCLIDINIUM SIDE CHAINS AND SYNTHESIS THEREOF

CROSS REFERENCE TO RELATED APPLICATIONS

This application is a continuation of PCT application No. PCT/US2024/024460, having an international filing date of Apr. 12, 2024, which claims the benefit of priority to U.S. provisional patent application No. 63/458,907, filed on Apr. 12, 2023, No. 63/459,184, filed on Apr. 13, 2023, No. 63/472,987, filed on Jun. 14, 2023, No. 63/616,542, filed on Dec. 30, 2023, No. 63/531,026, filed on Aug. 7, 2023, No. 63/532,235, filed on Aug. 11, 2023, No. 63/627,787, filed on Jan. 31, 2024, and No. 63/562,416, filed on Mar. 7, 2024; the entirety of all prior applications is hereby incorporated by reference therein.

BACKGROUND OF THE INVENTION

Field of the Invention

This application is directed to the new anion exchange poly(phenylene) co-polymers integrated with n-methylquinuclidinium.

Background

In recent years, proton exchange membrane fuel cells including solid polymer membrane as the electrolyte has been widely studied due to their high efficiency and density as well as low start temperature. However, the use of noble metal catalysts such as platinum has been an obstacle of viable commercialization of proton exchange membrane fuel cells. Also, high pH condition is a significant requirement for alkaline membrane fuel cells, which limits the utilization of proton exchange membrane. Therefore, the interest of developing anion exchange membranes (AEM) for alkaline fuel cells has prominently grown due to the low overpotentials caused by electrochemical reactions at alkaline environment and the dispensation of noble metal catalysts. A good anion exchange membrane for alkaline fuel cells should be with necessary conductivity, chemical and mechanical stability. Moreover, low cost is another significant requirement of developing new anion exchange membranes. For example, a well-known cation exchange membrane (Nafion) developed by DuPont contributes up to 40% of the total cost of some redox flow batteries. Hence, the high cost rendered people to seek more cheaper alternatives, primarily anion exchange membranes. Up to now, most commercially available anion exchange membranes are based on cross-linked polystyrene, which are not chemically stable in alkaline environments. Some other aryl ether-containing polymer backbones of anion exchange membranes tend to be attacked by hydroxide ions, which causes the degradation of the polymers. As a result, developing aryl ether-free polyphenylene-based ionomers employing stable cationic groups is a promising direction for anion exchange membrane (AEM) fuel cell. Poly(phenylene)s and their derivatives have received many attentions because of their good performance on thermal, mechanical, and electrochemical properties. However, the lower solubility of the growing rigid rod chains in the process of polymerization of poly(phenylene)s causes the low molecular weight. In order to overcome the issue, researchers tried to introduce pendent sidechains to the phenyl rings and successfully improved the solubility of poly(phenylene)s.

It should be noted that poly(phenylene)s is a kind of conjugated polymer which is promising in the application of biosensors research. To use those kind of polymer materials in biological applications, introducing appropriate sidechains to poly(phenylene) backbones and render them soluble in water and other polar solvents is critically necessary.

AEMs are generally made up of ionomers with pendant cationic groups such as benzyl trimethylammonium (BTMA) which is most commonly used, sulfonate and carboxylate etc. Hibbs et.al have applied BTMA cations for attaching to polymer backbones. Many BTMA-containing AEMs developed by them showed excellent properties and chemical stability. For example, the ion exchange capacity of a perfluorinated AEM with BTMA decreased less than 5% after 233-hour test at 50° C. Moreover, some BTMA-containing membranes can bear high temperature over 60° C. and keep chemical stability without thermal-degradation. Hence, the investigation and development of more chemically stable sidechains are becoming a considerable direction of enhancing anion exchange membrane (AEM) fuel cell.

SUMMARY OF THE INVENTION

The polyphenylene-based co-polymers integrated with N-methylquinuclidiniumcation are presented in this embodiment. There are few approaches reported for carbon-carbon coupling polymerizations such as Suzuki and Yamamoto coupling, which are two of methods has been widely and successfully used to synthesize poly(phenylene)s, which is costly and strict to the environment of storing Palladium-containing catalysts. In this embodiment, we applied super-acid catalyzed Friedel-Crafts polycondensation for the synthesis of the polyphenylene-based co-polymer mixtures comprising:

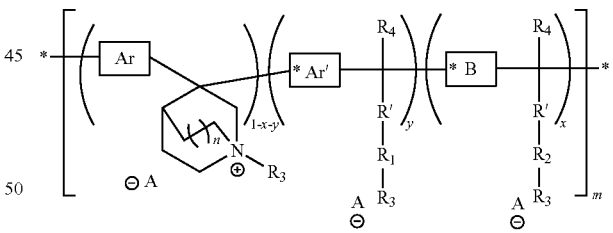

wherein:
Ar is selected from one of or multiple of the compounds from the group of aromatic compounds; Ar' is selected from one of or multiple of the compounds from the group of aromatic compounds; B is selected from one of or multiple of the compounds from the group of branching agents; R' is the same or different and independently of each other selected from the group consisting of hydrogen, alkyl, alkylene, cycloalkylene, arylene. X is the mole fraction of branching agent which is in the range of 0.001-1; y is in the range of 0-0.999, and 0.001≤x+y≤1.0; m is degree of polymerization which is in the range of 10-1000000. n is in the range of 0-10. R1, R2 are the same or different and independently of each other selected from the structures below and A⁻ is selected from halogen, hydroxide, or carbonate anions:

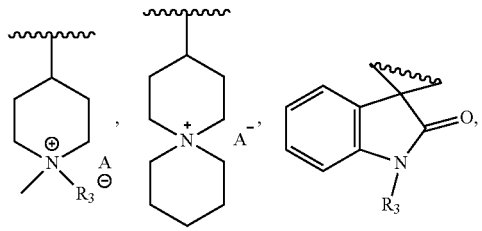

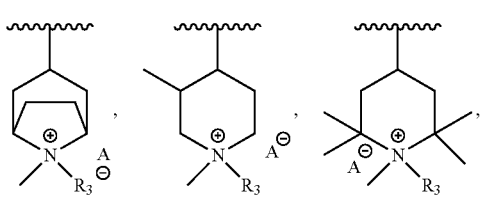

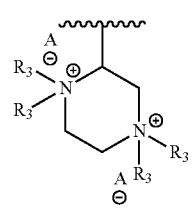

R3 is selected from the structures below and A⁻ is selected from halogen, hydroxide, or carbonate anions:

—$(CH_2)_nCH_3$ (n=0-10);

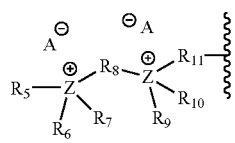

Wherein:

R8 and R11 are each independently alkyl, alkylene, alkynyl, aryl

R5, R6, R7, R9, R10 are each independently alkyl, alkylene, alkynyl, aryl

Z is N or P

For example a linear structure:

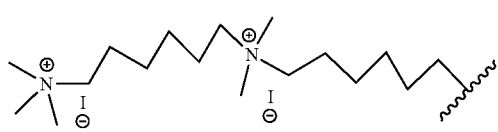 [SMILES: *CCCCCC[N+](C)(C)CCCCCC[N+](C)(C)C ; [I-] ; [I-]]

A cyclic structure

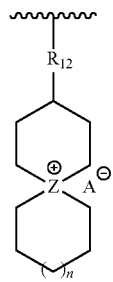

Wherein

R12 is selected from alkyl, alkylene, alkynyl, aryl, prefer C1-C6 n=1-10

Z is selected from N or P

X is halogen such as I, Br, Cl

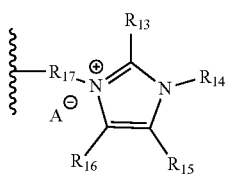

Wherein

R13, R14, R15, R16, R17 are the same or independently selected from alkyl, alkylene, alkynyl, aryl For example:

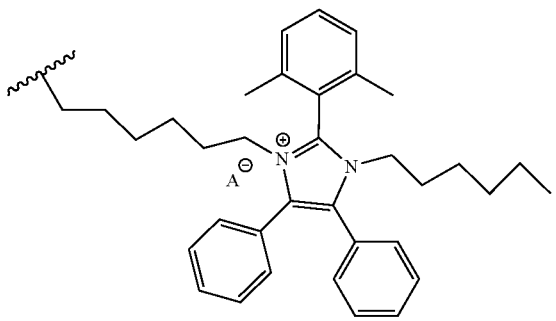

R4 is selected from CF3, proton

Ar is selected from one or multiple of the aromatic compounds having the structures below, including a polyxanthene as shown below:

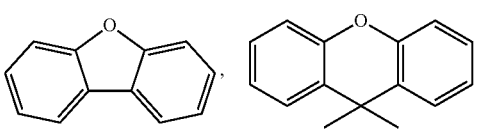

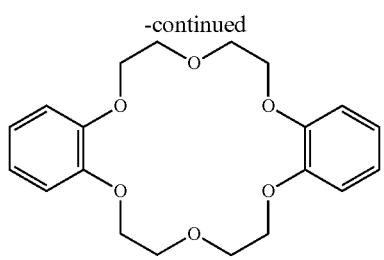
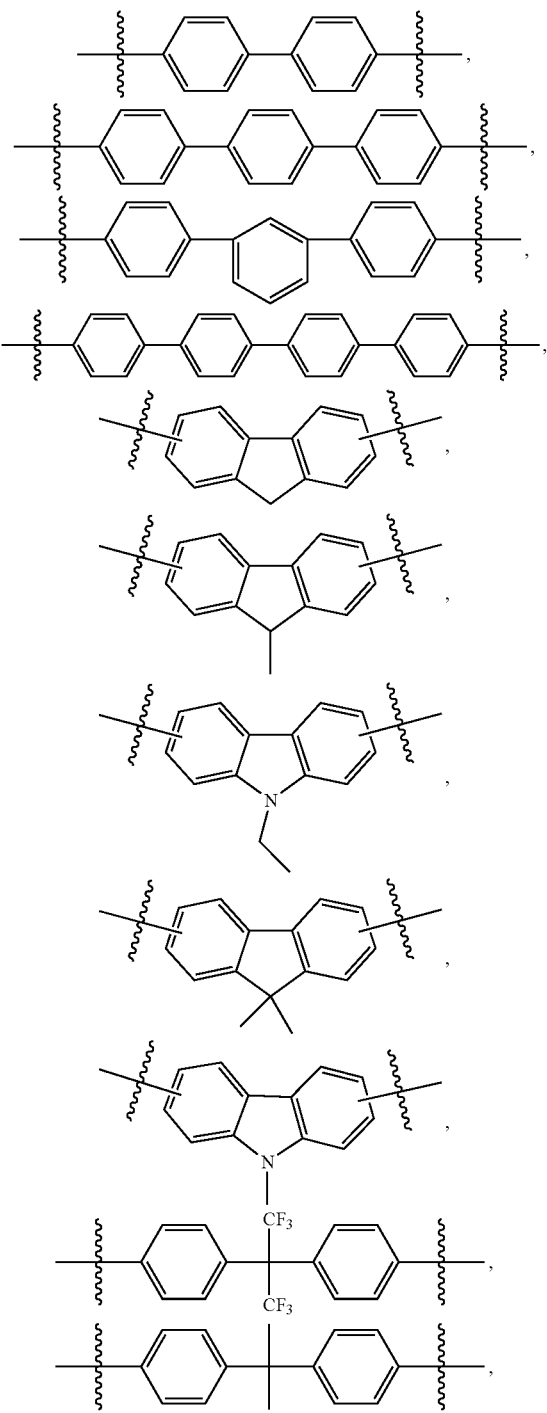
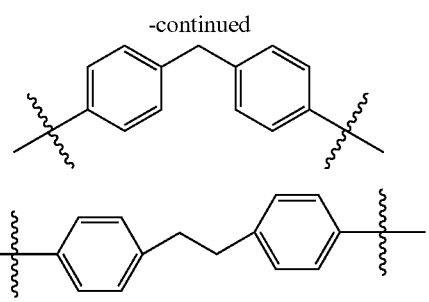
Ar' is selected from one or multiple of the aromatic compounds from the group above or from the aromatic compounds containing quaternary ammonium salt cations and having the structures below:
Wherein:
B is selected from one of or multiple of the compounds from the group below:
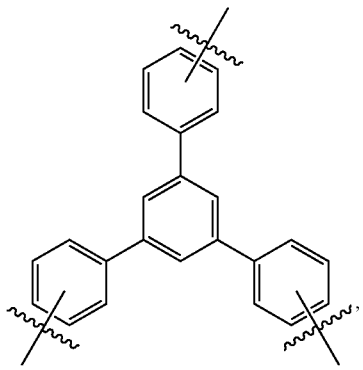
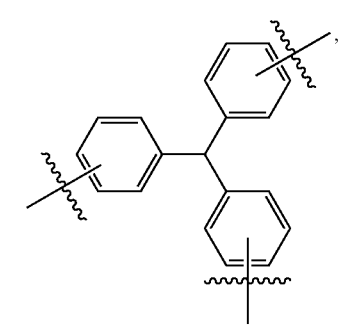
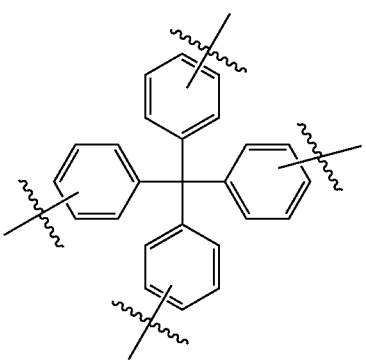

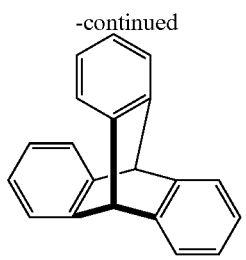

A method of synthesizing the co-polymers shown above are through polycondensation under the catalysis of one or both of strong acids such as trifluoromethanesulfonic acid (TFSA) and trifluoroacetic acid (TFA), which comprises those reacting monomers selected from Ar, Ar' and B as well as quinuclidinium derivative, trifluoroalkyl ketone derivatives. The reaction equation is shown below:

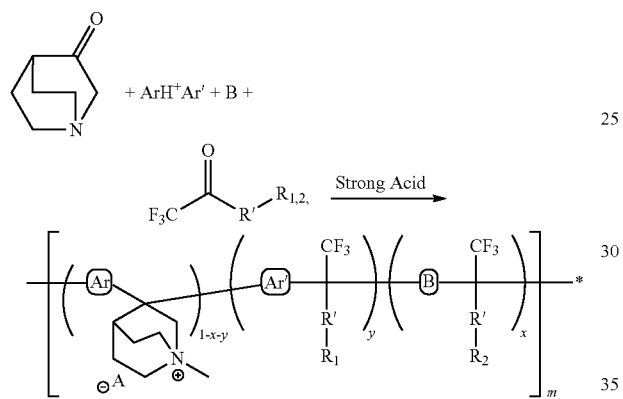

A branching compound enables higher entanglement of the polymer to prevent slipping and creep and overall mechanical properties including toughness and higher modulus. Also, a branching compound may enable high IEC as the functional sites may be configured more closely together. Also, the polymer as described herein may include multiple functional groups per side chain that can increase IEC.

Either dibenzofuran or xanthene are hydrophilic unit which is beneficial for phase separation morphology and subsequently increases conductivity.

The present invention provides two mechanically reinforced anion exchange membranes comprising a functional polymer based on polyxanthene backbone and poly(fluorene-aryl) co-backbone respectively with quaternary ammonium functional groups and an inert porous scaffold material for reinforcement. Typically, the anion exchange membrane is prepared by imbibing the porous scaffold material with a polymer solution of a non-ionic precursor polymer followed by conversion of a functional moiety on the polymer to form a trimethyl ammonium cation. Such a conversion can be accomplished by treatment of the precursor polymer membrane with trimethylamine. In addition, an optional chemical crosslinking reaction can also be used to toughen the polymer by converting it from a thermoplastic to a thermoset material. Such a conversion can be accomplished by treatment of the precursor polymer membrane by a diamine, which is typically performed before the amination reaction. Typically, the thickness of the functionalized membrane is 25 micrometers or less, more typically 10 micrometers or less, and in some embodiments 5 micrometers or less.

Exemplary polyxanthene-based and a poly(fluorene-aryl) based polymers may have functional groups selected from the group of quaternary ammoniums, tertiary diamines, phosphonium, benz(imidazolium), sulphonium, guanidinium, metal cations, pyridinium. Preferably the functional group is quaternary ammonium An ion exchange polymer may be improved by the incorporation of polyxanthene as it is increases conductivity because it includes hydrocarbons that make the polymer more hydrophilic and enables good phase separation in the anion exchange membrane. Then integrate polyxanthene as one component. Polyxanthene is more rigid than a linear polymer such as polyphylene which may aid in the formation of nano-channels for ion transport.

An exemplary porous scaffold support is made from polymer group consisting of polyolefins, polyamides, polycarbonates, cellulosics, polyacrylates, copolyether esters, polyamides, polyarylether ketones, polysulfones, polybenzimidazoles, fluoropolymers, and chlorinated polymers.

Exemplary polyxanthene-based and a poly(fluroene-aryl)-based polymers may have additive selected from a group consisting of radical scavengers, plasticizers, fillers, anion conducting material, crosslinking agent.

The polyxanthene-based polymer comprises 9H-xanthene with twisted structure and trifluoroalkyl side chains. In this embodiment, we applied super-acid catalyzed Friedel-Crafts polycondensation for the synthesis of polyxanthene-based AEM polymer comprising (i) polyxanthene backbone and trifluoroalkyl side chains having halogen active sites which can be functionalized by quaternary ammonium (QA) functional groups (1):

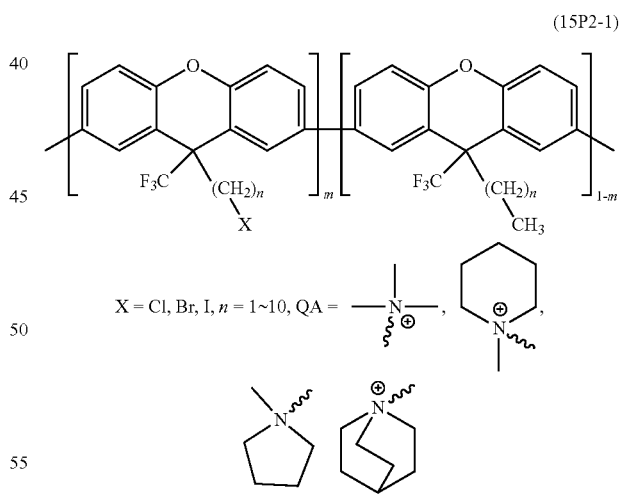

The poly(fluorene-aryl) polymer comprises 9H-xanthene with twisted structure and trifluoroalkyl side chains. In this embodiment, we applied super-acid catalyzed Friedel-Crafts polycondensation for the synthesis of polyxanthene-based AEM polymer comprising (i) poly(fluorene-aryl) backbone and alkylated phenyl side chains having halogen active sites which can be functionalized by quaternary ammonium (QA) functional groups (2):

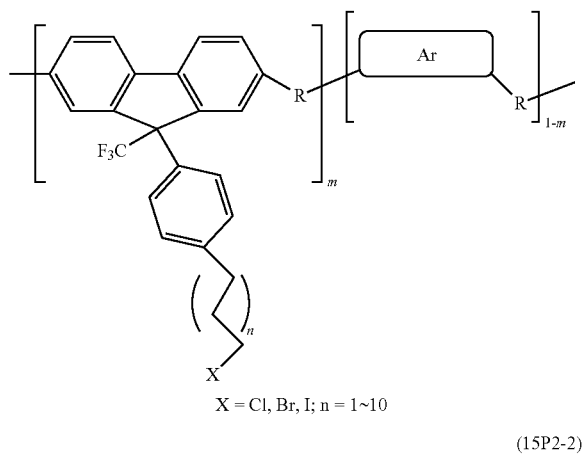

X = Cl, Br, I; n = 1~10

(15P2-2)

QA =  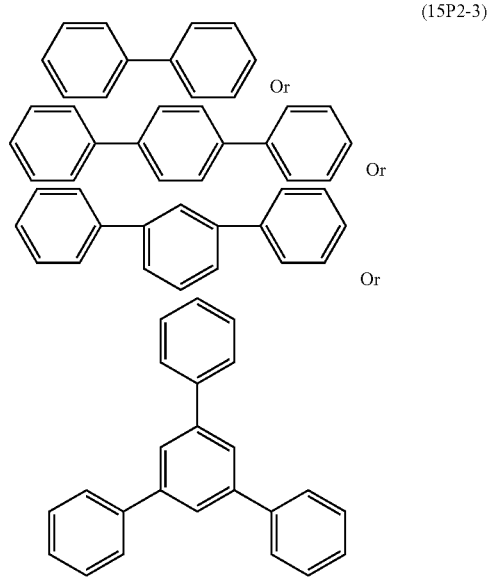

(ii) an Ar monomer having one or two of the structures below:

(15P2-3)

(15P2-3)

(iii) an R linker having one of the structures below:

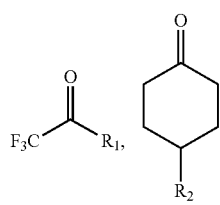

Wherein:
R1 is selected from the alkyl, aryl, R2 is selected from hydrogen, alkyl, aryl.

The two hydroxide exchange co-polymers are synthesized which comprises ether free poly(fluorene-aryl) and polyxanthene backbones integrated with functionalized spacer. The water uptake, IEC and conductivity were measured accordingly.

A method of synthesizing the hydroxide exchange co-polymers shown in Formula (15P2-1) and (15P2-2) is described below, which comprises that reacting monomers shown in either Formula (15P2-1) or (15P2-2) in organic solvent with super acid catalyst to form neutral intermediate polymers; quaternization of the neutral intermediate polymer in organic solvent to form ionic polymer; dissolvent the ionic polymer in organic solvent for solution-casting membranes; the membrane is immersed in base solution for ion exchange to form hydroxide exchange membrane.

A method of casting the anion exchange co-polymers shown above are described below, which comprises dissolving the co-polymers in one or multiple of organic solvents such as DMSO, NMP, DMAc, DMF and pouring and casting membranes on reinforced materials with different thicknesses. After evaporating organic solvents, the anion exchange membranes containing above polymer structures are obtained, the anion is halogen before converting to the other anions as such hydroxide, carbonate, bicarbonate, sulfate, phosphoric ion pairs.

An exemplary process for casting or making a composite anion exchange membrane includes combining a support layer solvent with an exchange polymer solvent to produce a solvent mixture. The support layer solvent may be an alcohol or solvent that is configured to wet the surface of a hydrocarbon polymer such as polypropylene or polyethylene. The exchange polymer solvent is configured to wet the anion exchange polymer and enable the polymer to form a solution or dissolve in the solvent. The anion exchange polymer is mixed with the solvent mixture and the combined with a support material, wherein this polymer solution wets the pores of the support layer and when the solvent is evaporated, leaves the anion exchange polymer in the pores to create a composite anion exchange membrane.

The reinforced materials are selected from Polytetrafluoroethylene (PTFE), expanded Polytetrafluoroethylene (ePTFE), polyethylene (PE), Polyether ether ketone (PEEK), Polyethylene terephthalate (PET)

The thickness of the reinforced anion exchange membrane is in the range 0.001-5 mm with a preferred being less than 200 μm, more preferred less than 100 μm and even more preferred less than 50 μm. The porous scaffold may be a microporous scaffold having an average or mean flow pore size of less than 1 micron as determined by a Capillary Flow Porometer, available from Porous Materials, Inc. Ithaca, NY, and the mean flow pore size may be about 0.5 microns or less, or even about 0.25 microns or less. A porous scaffold may be a porous fluoropolymer, such as expanded polytetrafluoroethylene or a porous olefin, such as a porous polyethylene and the like.

The thickness of the composite anion conductive membrane including an anion conductive polymer, as described herein, imbibe or coated onto a porous scaffold, may be about 50 microns or less, about 25 microns or less, about 15 microns or less, about 10 microns or less or even about 5 microns or less. The thinner the composite, the higher the rate ionic conductivity.

The present invention provides two mechanically reinforced anion exchange membranes comprising a functional polymer based on polyxanthene backbone with quaternary ammonium functional groups and an inert porous scaffold material for reinforcement. Typically, the anion exchange membrane is prepared by imbibing the porous scaffold material with a polymer solution of a non-ionic precursor polymer followed by conversion of a functional moiety on the polymer to form a trimethyl ammonium cation. Such a conversion can be accomplished by treatment of the precursor polymer membrane with trimethylamine. In addition, an optional chemical crosslinking reaction can also be used to toughen the polymer by converting it from a thermoplastic to a thermoset material. Such a conversion can be accomplished by treatment of the precursor polymer membrane by a diamine, which is typically performed before the amination reaction. Typically, the thickness of the functionalized membrane is 25 micrometers or less, more typically 10 micrometers or less, and in some embodiments 5 micrometers or less.

Exemplary polyxanthene-based polymers may have functional groups selected from the group of quaternary ammoniums, tertiary diamines, phosphonium, benz(imidazolium), sulphonium, guanidinium, metal cations, pyridinium. Preferably the functional group is quaternary ammonium.

An exemplary porous scaffold support is made from polymer group consisting of polyolefins, polyamides, polycarbonates, cellulosics, polyacrylates, copolyether esters, polyamides, polyarylether ketones, polysulfones, polybenzimidazoles, fluoropolymers, and chlorinated polymers.

Exemplary polyxanthene-based polymers may have additive selected from a group consisting of radical scavengers, plasticizers, fillers, anion conducting material, crosslinking agent.

The polyxanthene-based polymer comprises 9H-xanthene with planar backbone structure and trifluoroalkyl, N-heterocyclic side chains. In this embodiment, we applied super-acid catalyzed Friedel-Crafts polycondensation for the synthesis of polyxanthene-based AEM polymer comprising:
(iv) polyxanthene backbone and trifluoroalkyl side chains having halogen active sites which can be functionalized by quaternary ammonium (QA) functional groups (1):

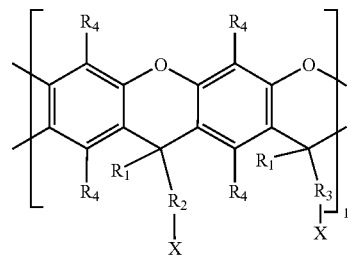

(15P3-1)

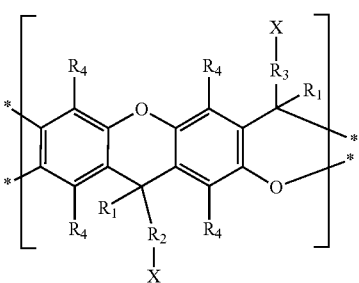

(15P3-2)

R1 is independently selected from haloalkane, Hydrogen, alkyl; R2 is independently selected from aryl, alkyl, aryl-alkane, n-heterocyclic alkyl; R3 is independently selected from aryl, alkyl, aryl-alkane, n-heterocyclic alkyl; R4 is independently selected from hydrogen, alkyl, aryl.

X=H, Cl, Br, I, n=1~10, QA=

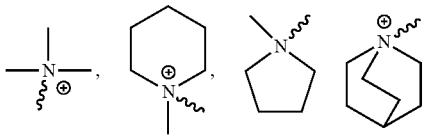

The polyxanthene-based polymer comprises 9H-xanthene with planar backbone structure and trifluoroalkyl, wherein the planar backbone is defined by pi interactions, such that it can not be twisted or rotated.

The poly(alkyl-xanthene) polymer comprises 9H-xanthene with twisted structure and trifluoroalkyl side chains. In this embodiment, we applied super-acid catalyzed Friedel-Crafts polycondensation for the synthesis of polyxanthene-based AEM polymer comprising
(ii) poly(alkyl-xanthene) backbone and alkylated phenyl side chains having halogen active sites which can be functionalized by quaternary ammonium (QA) functional groups (15P3-2):

(15P3-3)

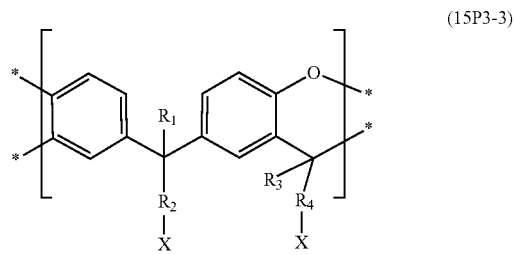

R1 is independently selected from haloalkane, Hydrogen, alkyl; R2 is independently selected from aryl, alkyl, aryl-alkane, N-heterocyclic alkane; R3 is independently selected from haloalkane, Hydrogen, alkyl; R4 is independently selected from aryl, alkyl, aryl-alkane, N-heterocyclic alkane; X is independently selected from H, Cl, Br

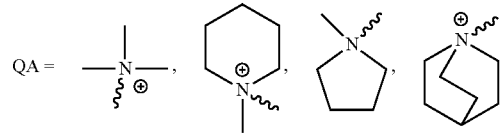

The two hydroxide exchange co-polymers are synthesized which comprises ether free polyxanthene and poly(alkyl-xanthene) backbones integrated with functionalized spacer. The water uptake, IEC and conductivity were measured accordingly.

A method of synthesizing the hydroxide exchange co-polymers shown in Formula (15P3-1) and (15P3-2) and (15P3-3) is described below with acid catalyst to form neutral intermediate polymers; quaternization of the neutral intermediate polymer in organic solvent to form ionic polymer; dissolvent the ionic polymer in organic solvent for solution-casting membranes; the membrane is immersed in base solution for ion exchange to form hydroxide exchange membrane. The acid is independently selected from hydrochloride acid, sulfuric acid, triflic acid, trifluoracetic acid.

The porous scaffold may be a microporous scaffold having an average or mean flow pore size of less than 1 micron as determined by a Capillary Flow Porometer, available from Porous Materials, Inc. Ithaca, NY, and the mean flow pore size may be about 0.5 microns or less, or even about 0.25 microns or less. A porous scaffold may be a porous fluoropolymer, such as expanded polytetrafluoroethylene or a porous olefin, such as a porous polyethylene and the like.

The thickness of the composite anion conductive membrane including an anion conductive polymer, as described herein, imbibe, or coated onto a porous scaffold, may be about 50 microns or less, about 25 microns or less, about 15 microns or less, about 10 microns or less or even about 5 microns or less. The thinner the composite, the higher the rate ionic conductivity.

This application incorporates by reference, U.S. provisional patent application No. 63/196,671, filed on Jun. 3, 2021, U.S. provisional patent application No. 63/278,780, filed on Nov. 12, 2021, U.S. provisional patent application No. 63/274,702 filed on Nov. 2, 2021; U.S. provisional patent No. 63/451,555, filed on Mar. 11, 2023, and U.S. provisional patent No. 63/472,987, filed on Jun. 14, 2023; the entirety all prior applications are hereby incorporated by reference herein.

The present invention provides a mechanically reinforced phosphoric acid doped ion pair ion exchange membrane comprising a functional polymer based on a poly(phenylene) backbone with quaternary ammonium and N-Methylpiperidine-based functional groups and an inert porous scaffold material for reinforcement. Typically, the starting anion exchange membrane is prepared by imbibing the porous scaffold material with a polymer solution of a non-ionic precursor polymer followed by conversion of a functional moiety on the polymer to form a trimethyl ammonium cation. Such a conversion can be accomplished by treatment of the precursor polymer membrane with trimethylamine. The phosphoric acid doping process was conducted in phosphoric acid bath. Typically, the thickness of the functionalized membrane is 25 micrometers or less, more typically 10 micrometers or less, and in some embodiments 5 micrometers or less.

Exemplary poly(phenylene) may have functional groups selected from the group of quaternary ammoniums, tertiary diamines, phosphonium, benz(imidazolium), sulphonium, guanidinium, metal cations, pyridinium. Preferably the functional group is quaternary ammonium.

An exemplary porous scaffold support is made from polymer group consisting of polyolefins, polyamides, polycarbonates, cellulosics, polyacrylates, copolyether esters, polyamides, polyarylether ketones, polysulfones, polybenzimidazoles, fluoropolymers, and chlorinated polymers.

Exemplary polyphenylene may have additive selected from a group consisting of radical scavengers, plasticizers, fillers, anion conducting material, crosslinking agent.

The polyphenylene co-polymers comprises 9,9-Dimethylxanthene with twisted structure and the derivative of alkane in which one phenyl group is bonded to each carbon atom are presented in this embodiment. There are few approaches reported for carbon-carbon coupling polymerizations such as Suzuki and Yamamoto coupling, which are two of methods has been widely and successfully used to synthesize poly(phenylene)s, which is costly and strict to the environment of storing Palladium-containing catalysts. In this embodiment, we applied super-acid catalyzed Friedel-Crafts polycondensation for the synthesis of the co-polymer mixtures comprising (v) Either A trifluoro-based and isatin-based spacer having the precursor chemical structures (20P-1) and (20P-2):

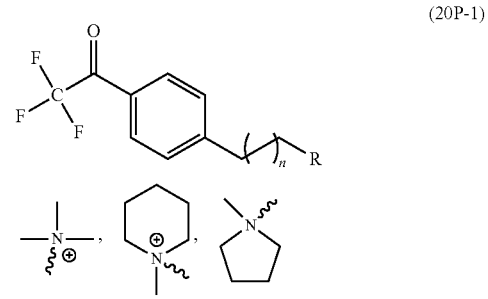

(20P-1)

$n = 1\sim10, R =$ (20P-2)

$n = 1\sim10, R =$ (vi) an aromatic monomer having the structure (20P-3):

(20P-3)

Or

Or

Or (vii) a derivative of alkane having the structure (20P-4)

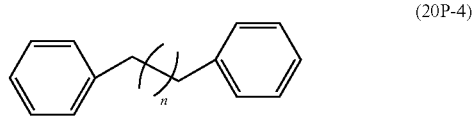 [SMILES: c1ccc(CCc2ccccc2)cc1]
(20P-4)

Wherein:
n is in the range of 1-10
(viii) a fluorene-based structure having the structure (20P-5)

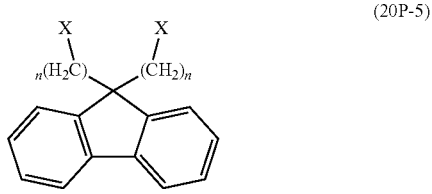
(20P-5)

Wherein:
n=1~10, X=Cl, Br, I
The Anion Exchange Co-Polymers Having the Formula (20P-1):

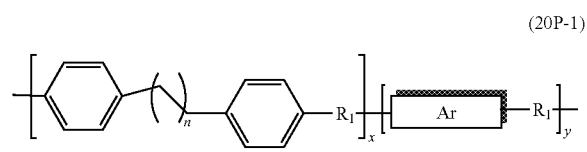
(20P-1)

Wherein:
R1 is selected from the anyone from structure (20P-1) or (20P-2)
The Anion Exchange Co-Polymers Having the Formula (20P-2):

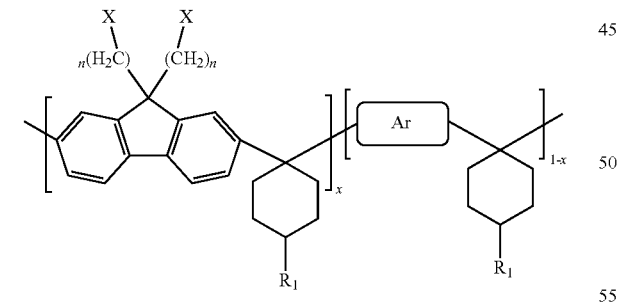

The starting anion exchange co-polymers are synthesized which comprises ether free polyphenylene backbones integrated with functionalized spacer. The water uptake, IEC and conductivity were measured accordingly A method of synthesizing the hydroxide exchange co-polymers shown in Formula (1) & (2) is described below, which comprises that reacting monomers shown in Formula (1) in organic solvent with super acid catalyst to form neutral intermediate polymers; quaternization of the neutral intermediate polymer in organic solvent to form ionic polymer; dissolvent the ionic polymer in organic solvent for solution-casting membranes; the membrane is immersed in base solution for ion exchange to form hydroxide exchange membrane.

The present invention provides a mechanically reinforced phosphonate-based ion pair exchange membrane comprising a functional co-polymer based on a poly(phenylene) backbone and an inert porous scaffold material for reinforcement. Typically, the starting co-polymer is prepared by imbibing the porous scaffold material with a polymer solution of a non-ionic precursor polymer followed by conversion of a functional moiety on the polymer to form phosphonate group. Such a conversion can be accomplished by treatment of the starting co-polymer membrane with Michaelis-Arbuzov reaction. Typically, the thickness of the functionalized membrane is 25 micrometers or less, more typically 10 micrometers or less, and in some embodiments 5 micrometers or less.

An exemplary porous scaffold support is made from polymer group consisting of polyolefins, polyamides, polycarbonates, cellulosics, polyacrylates, copolyether esters, polyamides, polyarylether ketones, polysulfones, polybenzimidazoles, fluoropolymers, and chlorinated polymers.

Exemplary polyphenylene may have additive selected from a group consisting of radical scavengers, plasticizers, fillers, anion conducting material, crosslinking agent.

The polyphenylene co-polymers comprises aromatic compounds, fluorenes, and the derivative of alkane in which one phenyl group is bonded to each carbon atom are presented in this embodiment. There are few approaches reported for carbon-carbon coupling polymerizations such as Suzuki and Yamamoto coupling, which are two of methods has been widely and successfully used to synthesize poly(phenylene)s, which is costly and strict to the environment of storing Palladium-containing catalysts. In this embodiment, we applied super-acid catalyzed Friedel-Crafts polycondensation for the synthesis of the co-polymer mixtures comprising (ix) trifluoro-based spacer having the precursor chemical structures (24P-1) and (24P-2):

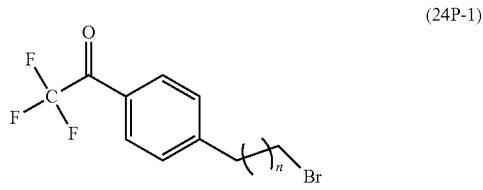
(24P-1)

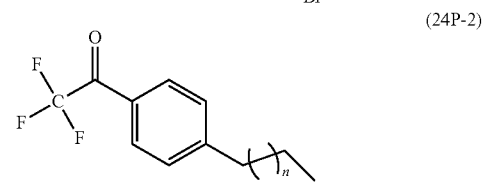
(24P-2)

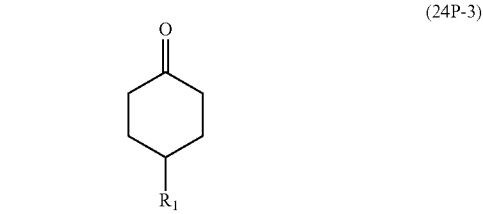
(24P-3)

Wherein R1=H, alkyl, aryl (x) an aromatic monomer having the structure (24P-3):

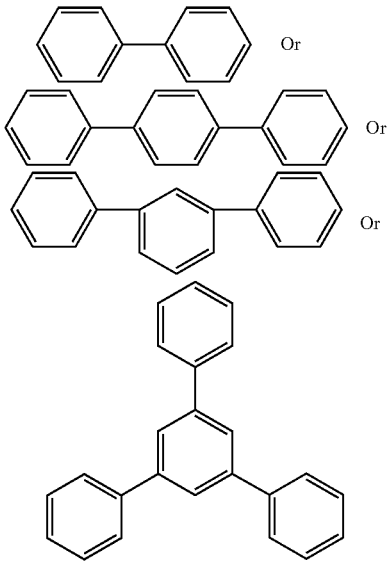
(24P-3)

(xi) a derivative of alkane having the structure (24P-4)

(24-4)

Wherein:

n is in the range of 1-10

(IV) a fluorene-based derivative having the structure (24P-5)

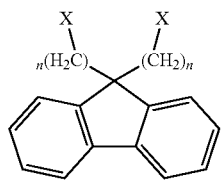

Wherein: n is in the range of 1-10, X=Cl, Br, I

The anion exchange co-polymers having the formula (24P-1) and (24P-2):

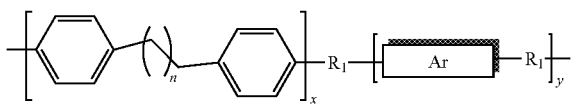
(24P-1)

Wherein R1 is selected from the anyone from the structure (1) & (2), the ratio between the structure (1) and (2) is in the range of 1:0-1

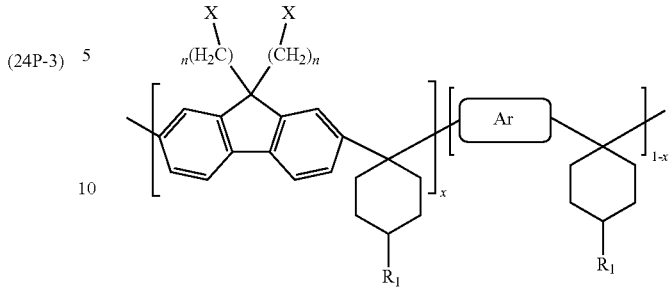
(24P-2)

Wherein R1=H, alkyl, aryl

The starting co-polymers are synthesized which comprises ether free polyphenylene backbones integrated with functionalized spacer. The water uptake, IEC and conductivity were measured accordingly A method of synthesizing the starting co-polymers shown in Formula (24P-1) is described below, which comprises that reacting monomers shown in Formula (24P-1) in organic solvent with super acid catalyst to form neutral intermediate polymers; phosphorylation of the neutral intermediate polymer in organic solvent to form ionic polymer; dissolvent the ionic polymer in organic solvent for solution-casting membranes;

The porous scaffold may be a microporous scaffold having an average or mean flow pore size of less than 1 micron as determined by a Capillary Flow Porometer, available from Porous Materials, Inc. Ithaca, NY, and the mean flow pore size may be about 0.5 microns or less, or even about 0.25 microns or less. A porous scaffold may be a porous fluoropolymer, such as expanded polytetrafluoroethylene or a porous olefin, such as a porous polyethylene and the like.

The thickness of the composite anion conductive membrane including an anion conductive polymer, as described herein, imbibed or coated onto a porous scaffold, may be about 50 microns or less, about 25 microns or less, about 15 microns or less, about 10 microns or less or even about 5 microns or less. The thinner the composite, the higher the rate ionic conductivity.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
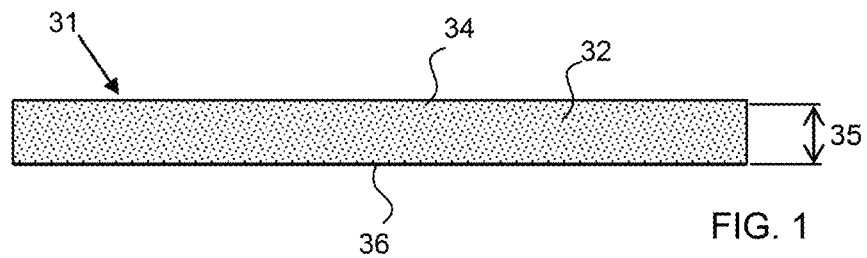
FIG. 1 shows cross-sectional view of an exemplary anion exchange membrane comprising a thin sheet, less than 200 μm thick of anion exchange polymer.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

As shown in FIG. 1, an anion exchange membrane 31 is a planar thin layer of anion exchange polymer 32 having a planar first side 34 and second side 36, wherein the first side and second side extend in parallel to produce a substantially uniform thickness of the anion exchange membrane, with variations in thickness of no more than about 35% and preferably no more than 25% or even 10%.

Figure 2:
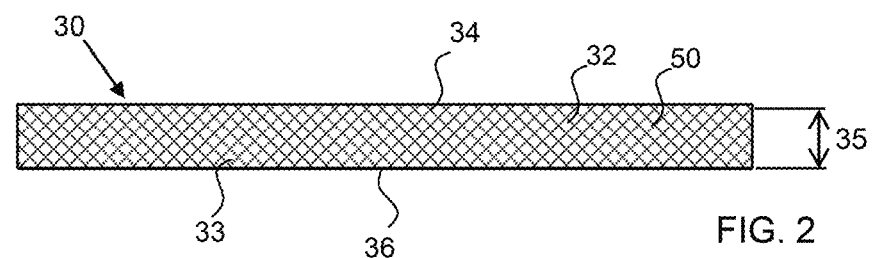
FIG. 2 shows cross-sectional view of an exemplary porous reinforced support having a porous structure and pores therein, wherein the anion exchange polymer substantially fills the pores of the scaffold support.

As shown in FIG. 2, the anion exchange polymer 32 may be configured in a composite anion exchange membrane 30 has a support layer 33 and with anion exchange polymer 32 extending through the pores 50 from a first side 34 or anode side, to a second side 36 or cathode side. The thickness 35 of the composite anion exchange membrane 30 may be about 200 μm or less, about 150 μm or less, about 100 μm or less, about 50 μm or less, about 30 μm or less, about 25 μm or less, about 15 μm or less, about 10 μm or less, or even 5 μm or less.

Figure 3:
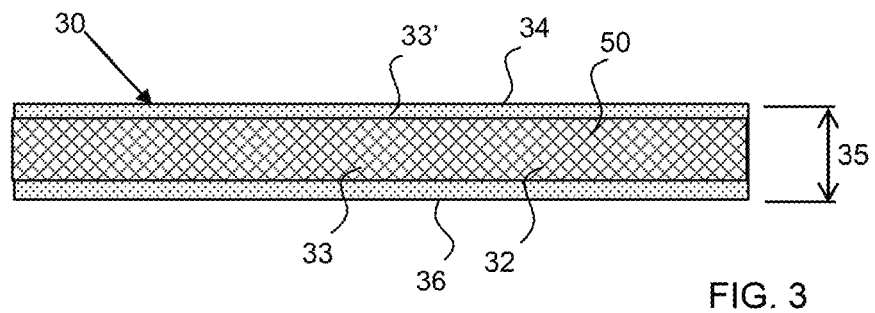
FIG. 3 shows a cross-sectional view of an exemplary ultra-thin composite anion exchange polymer film having a layer of anion exchange polymer on either side of the porous reinforced support.

As shown in FIG. 3, a composite anion exchange membrane 30 has a support layer 33 with anion exchange polymer 32 extending through the pores 50 of the support layer from a first side to a second side 36 of the support layer. Also, there is a layer of anion exchange polymer extending on the anode and cathode side, or first 34 and opposing second side of the composite anion exchange membrane 30. The thickness 35 of the composite anion exchange membrane 30 may be 50 um or less, about 30 um or less, about 25 um or less, about 15 um or less, about 10 um or less, or even 5 um or less. The proton exchange polymer 32 may be configured on just one side of a support layer 33, or may be only with the support layer or on one side and within at least partially the support layer.

Figure 4:
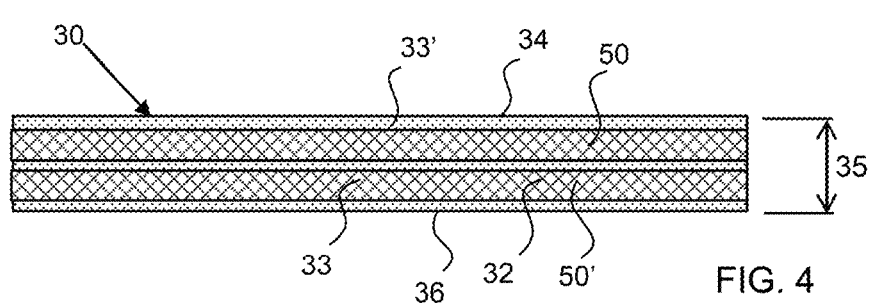
FIG. 4 shows cross-sectional view of an exemplary ultra-thin composite anion exchange polymer film formed by imbibing anion exchange polymer copolymer into a porous reinforced support using solution casting process, wherein the anion exchange polymer substantially fills the pores of the reinforced support.

As shown in FIG. 4, a composite anion exchange membrane 30 has a plurality of support layers 33 and 33' and with anion exchange polymer 32 extending through the pores 50, 50' of each layer from a first side to a second side 36 of each support layer. Also, there is a layer of anion exchange polymer extending on the anode and cathode side, or first 34 and opposing second side of the composite anion exchange membrane 30. The thickness 35 of the composite anion exchange membrane 30 may be 50 um or less, about 30 um or less, about 25 um or less, about 15 um or less, about 10 um or less, or even 5 um or less.

Figure 5:
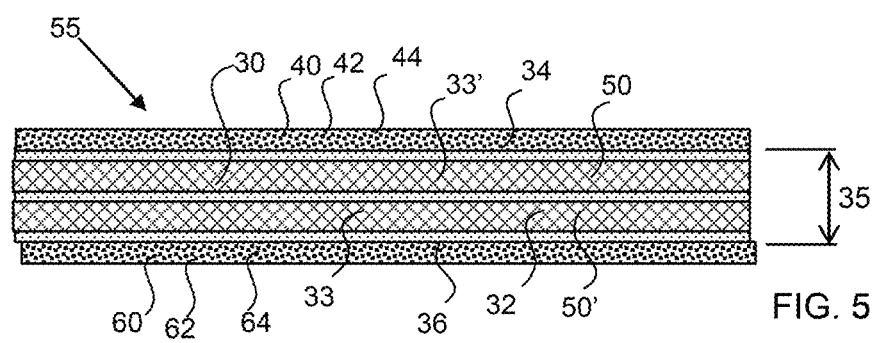
FIG. 5 shows cross-sectional view of an exemplary membrane electrode assembly comprising a composite anion exchange membrane with a cathode on a first side and a anode on a second side.

As shown in FIG. 5, the composite anion exchange membrane 30 may be incorporated into a membrane electrode assembly 55, having an anode 40 and cathode 60 on an opposing side of the composite anion exchange membrane 30. The anode may comprise an anode catalyst 42 and may also include an anode anion exchange polymer 44, which may be the same or different from the anion exchange polymer in the composite anion exchange membrane 30 or anion exchange membrane. Likewise, the cathode may comprise a cathode catalyst 62 and may also include an anode anion exchange polymer 64, which may be the same or different from the anion exchange polymer in the composite anion exchange membrane 30 or anion exchange membrane.

According to one embodiment, a synthetic route and a composition are disclosed. The composition includes one compound with poly(phenylene) backbones. The backbone of the polymer structure shown below consists of aryl rings, wherein one of the aryl rings links to a sidechain at para-position including a trifluoromethyl-based spacers and N-methylquinuclidiniumquaternary functional group.

Details of a process for synthesizing the anion conductive polymer and casting anion exchange membrane are presented in Example 1.

Example 1 to fully convert to bromine form after completely evaporating DMSO. As needed, the anion exchange membranes can be converted to hydroxide form by immersing in NaOH solution for 3-4 days under inert atmosphere.

15P2

The precursor polymer solution was then applied to a microporous polyethylene material tensioned around a chemically resistant plastic frame. The polymer solution was then poured on to the microporous scaffold. The frame was covered with a lid to slow solvent evaporation. The membrane was dried at room temperature. The final thickness of the precursor membrane was 5 micrometers.

The precursor polymer was then applied to a microporous polyethylene or poly(tetrafluoroethylene) material with a doctor blade. The precursor polymer membrane was covered with a lid to slow solvent evaporation. The membrane was dried at room temperature. The final thickness of the membrane was 5-50 microns.

In one embodiment, a precursor membrane with formula (15P2-2) is prepared by dissolving the precursor polymer in a non-polar solvent such as chloroform, dichloromethane, tetrahydrofuran and toluene at a 1%-10% weight percent i.e.

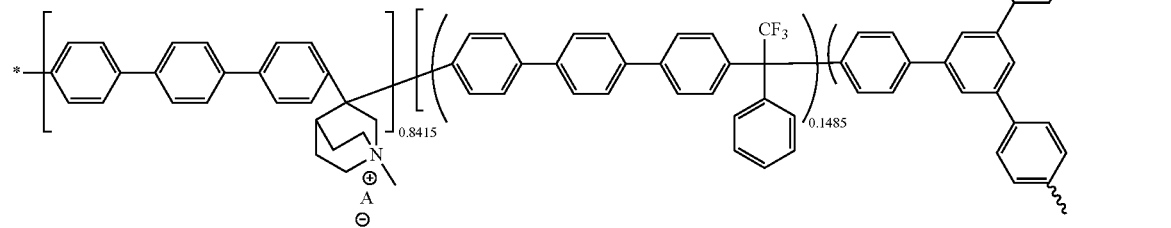

The polymer was synthesized via super-acid catalyzed polycondensation, which compromises that homogeneously mixing p-terphenyl (0.69 g, 3.0 mmol), 1-Azabicyclo[2.2.2]octan-3-one in chloride form (0.45 g, 2.78 mmol), 2,2,2-Trifluoro-1-phenylethanone (0.09 g, 0.52 mmol) and 1,3,5-triphenylbenzene (9.2 mg, 0.03 mmol) in dichloromethane, then the mixture was stirred at room temperature for 24 hours under the catalysis of TFAS. The resulting gel-like mixture was diluted with DMSO and poured into isopropanol to obtain white fiber-like polymer before washing the product with diethyl ether and drying under vacuum overnight.

The quaternization for obtaining final anion exchange polymer was carried out through mixing 1 equivalent of the polymer obtained above, 3 equivalent $K_2CO_3$, 5 equivalent iodomethane in 10 ml DMSO and stirring for 48 hours under dark environment before pouring the resulting mixture to isopropanol to obtain final anion conductive polymer.

The anion exchange membrane was prepared by dissolving the anion conductive polymer in DMSO to form 5 wt % solution, and then cast membranes on reinforced scaffold porous support material using doctor blade. The resulting membranes were immersed in 1M KBr solution for a week 0.25 grams of polymer dissolved in 2.25 g of solvent for a 10% solution. The mixture was stirred until homogenous and translucent.

The precursor polymer solution was then applied to a microporous polyethylene or poly(tetrafluoroethylene) material tensioned around a chemically resistant plastic frame. The polymer solution was then poured on to the microporous scaffold. The frame was covered with a lid to slow solvent evaporation. The membrane was dried at room temperature. The final thickness of the precursor membrane was 5-50 micrometers.

It will be apparent to those skilled in the art that the latter embodiment can be scaled up to a roll-to-roll, continuous process.

In the case of either embodiment, multiple coatings can be applied to increase the membrane thickness or to facilitate filling of the porous material.

In the case of either embodiment, the precursor polymer membrane can be functionalized chemically or soaked in the aqueous or alcohol solution of a QA compound shown above to convert the haloalkyl moieties within the precursor polymer to a quaternary ammonium head-group enabling anion conduction within the membrane. The mobile halogen counter ion (e.g. bromide, chloride or iodide) can later be exchanged with hydroxide ions.

Optionally, the precursor polymer membrane can contain or be soaked in a diamine, such as tetramethyl hexyldiamine, to cross-link some or all of the haloalkyl moieties. The cross-linking is preferably carried out before the amination reaction in trimethylamine; however, cross-linking may also be carried out after amination.

Figure 6:
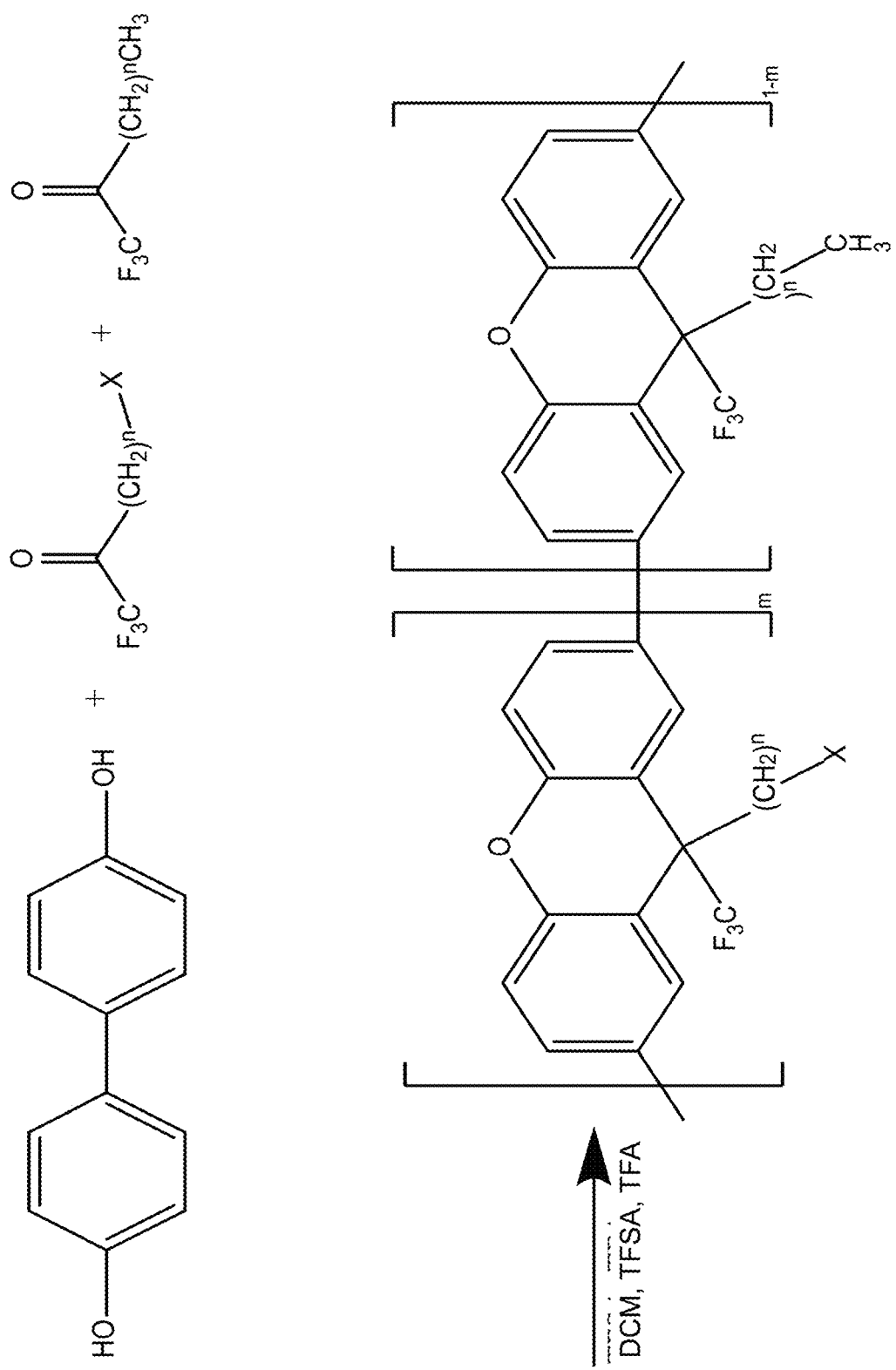
FIG. 6 shows the polymer structure of polyxanthene.

FIG. 6 shows the polymer structure of polyxanthene.

FIG. 6 shows the synthetic routes for the precursor polymer shown in formula (15P2-1).

Figure 7:
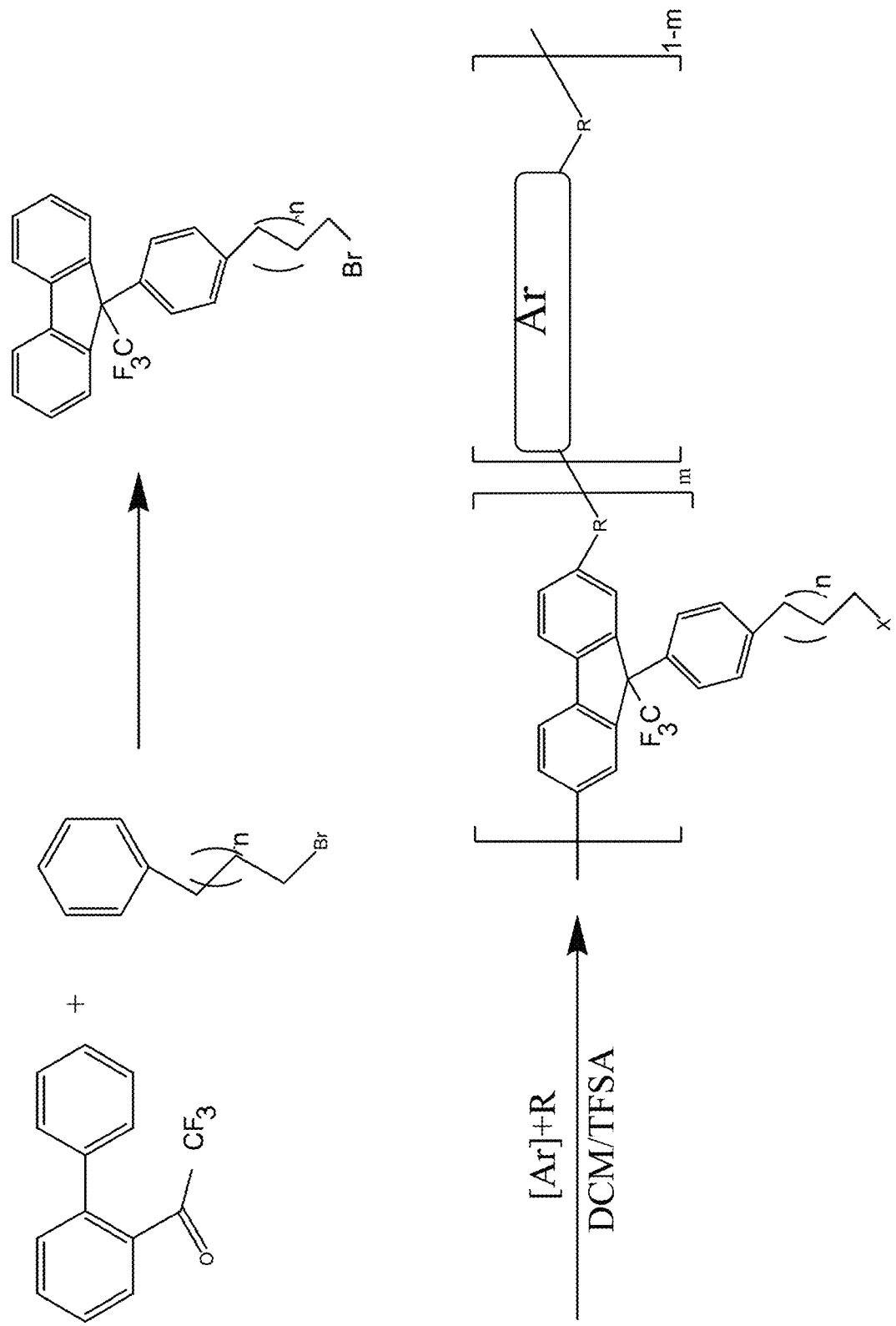
FIG. 7 shows the polymer structure of poly(fluorene-aryl).

FIG. 7 shows the polymer structure of poly(fluorene-aryl) and the synthetic routes for the precursor polymer shown in formula (15P2-2).

The starting materials for the synthesis of the precursor polymer shown in formula (15P2-1) are all commercially available.

The synthesis of the starting monomer for the polymerization of the precursor polymer shown in formula (15P2-2) was firstly investigated, which was that for example 4 mmol 1-[1,1'-Biphenyl]-2-yl-2,2,2-trifluoroethanone and 8.8 mmol (3-Bromopropyl) benzene were dissolved in 10 ml dichloromethane, then 5 ml trifluoromethanesulfonic acid was added dropwise to the solution. The reaction was running at room temperature for 4 hours before pouring the mixture into water. The crude compound was purified by chromatography after the step of extraction.

Details of the process for polymerizing the precursor polymer shown in formula (15P2-1) and (15P2-2) are further described separately in Example 15P2-1 and 15P2-2.

Example 15P2-1: Polymerization and Functionalization of the Precursor Polymer Shown in Formula (15P2-1)

For the polymerization, the side chain with seven carbons was selected as an example. A 250 ml three-neck flask was added with a mixture of 4,4'-biphenol (1.0 eq), 7-bromo-1 1 1-trifluoro-2-heptanone and 1,1,1-Trifluoro-2-heptanone with a ratio (1:0~1) (totally 1.1 eq) were added to dichloromethane. Then, trifluoromethanesulfonic acid was added to the mixture dropwise before the reaction finished within 90 minutes. The precursor polymer was precipitated by adding above mixture into methanol. The polymer was washed by hot methanol and water for three time. After the polymer is dried, the polymer was dissolved in a non-polar solvent such as chloroform, dichloromethane, tetrahydrofuran and toluene with weight percent of 1%-10% for further membrane casting. The membrane then was immersed in a QA compound solution for three days to get functionalized. Alternatively, the precursor polymer could be dissolved in a polar solvent such as DMSO, DMF, DMAc, then a QA compound ethanol solution was added to the polymer solution for running for three days at room temperature. The homogenously functionalized polymer was precipitated by pouring the solution into diethyl ether.

Example 15P2-2: Polymerization and Functionalization of the Precursor Polymer Shown in Formula (15P2-2)

For the polymerization, 1.0 eq of the monomer synthesized above, 0-1 eq of an aromatic compound selected from the above group, and 2.2 eq of a linker compound selected from above group were dissolved in dichloromethane. Then trifluoromethanesulfonic acid was added to the mixture solution dropwise before the reaction finished in 9-12 hours.

The precursor polymer was precipitated by adding the reaction mixture into methanol. The polymer was washed by hot methanol and water for three time. After the polymer is dried, the polymer was dissolved in a non-polar solvent such as chloroform, dichloromethane, tetrahydrofuran and toluene with weight percent of 1%-10% for further membrane casting. The membrane then was immersed in a QA compound solution for three days to get functionalized. Alternatively, the precursor polymer could be dissolved in a polar solvent such as DMSO, DMF, DMAc, then a QA compound ethanol solution was added to the polymer solution for running for three days at room temperature. The homogenously functionalized polymer was precipitated by pouring the solution into diethyl ether.

Figure 8:
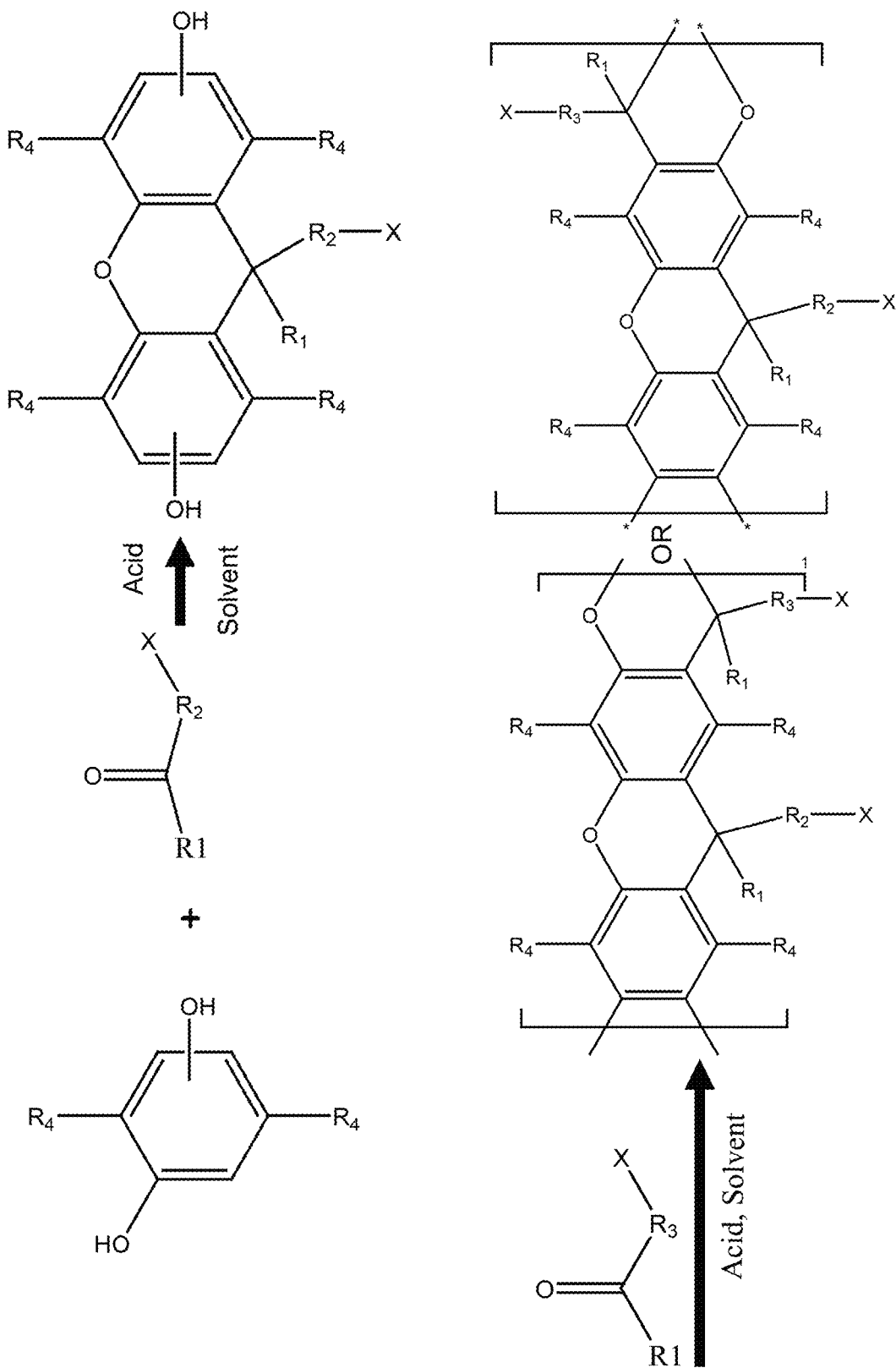
FIG. 8 shows the polymer structure of polyxanthene.

FIG. 8 shows the synthetic routes for the precursor polymer shown in formula (15P3-1) and (15P3-2).

Figure 9:
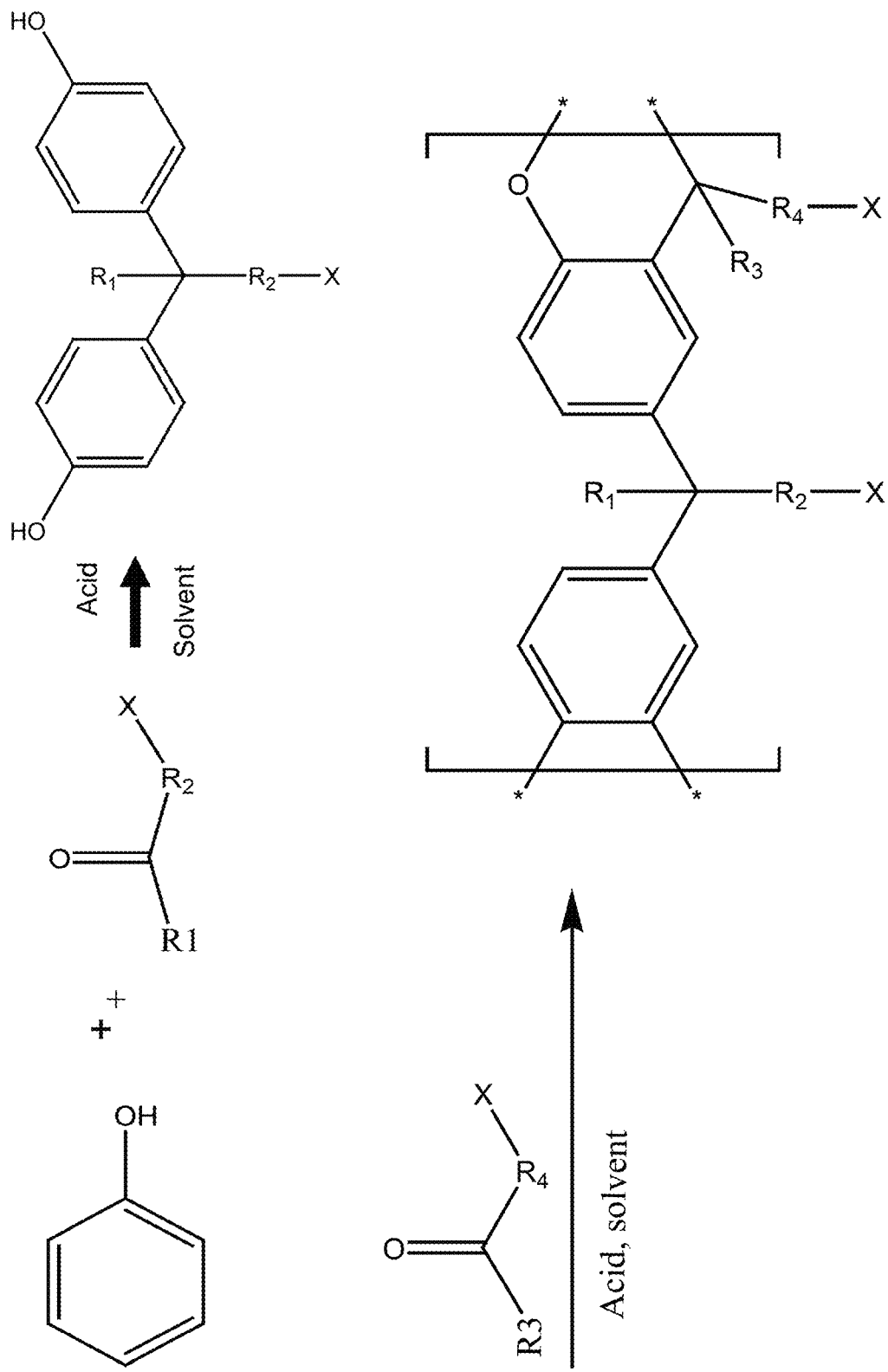
FIG. 9 shows the polymer structure of poly(fluorene-aryl).

FIG. 9 shows the synthetic routes for the precursor polymer shown in formula (15P3-3). The starting materials for the synthesis of the precursor polymer shown in formula (15P3-1), (15P3-2), (15P3-3) are all commercially available. The synthesis of the starting monomer for the polymerization of the precursor polymer shown in formula (15P3-1) or (15P3-2) was referred by a published method, which was that for example 1 eq of either Resorcinol or 2-methylresorcino or hydroquinone and 0.5 eq of 2,2,2-trifluoroacetophenone were mixed in 40 ml dichloromethane, then 0.25 eq of trifluoromethanesulfonic acid was added dropwise to the solution. The reaction was running at room temperature for 4-8 hours before pouring the mixture into water. The crude compound collected was purified by recrystallization.

Details of the process for polymerizing the precursor polymer shown in formula (15P3-1) and (15P3-2) are further described separately in Example 15P3-1.

Example 15P3-1: Polymerization and Functionalization of the Precursor Polymer Shown in Formula (15P3-1)

For the polymerization, the side chain with seven carbons was selected as an example. A 250 ml three-neck flask was added with a mixture of 4,4'-biphenol (1.3 eq), 7-bromo-1 1 1-trifluoro-2-heptanone and 1.0 eq of the monomer synthesized above were added to dichloromethane. Then, trifluoromethanesulfonic acid was added to the mixture dropwise before the reaction finished within 120 minutes. The precursor polymer was precipitated by adding above mixture into methanol. The polymer was washed by hot methanol and water three time. After the polymer is dried, the polymer was dissolved in a non-polar solvent such as chloroform, dichloromethane, tetrahydrofuran and toluene with weight percent of 1%-10% for further membrane casting. The membrane then was immersed in a QA compound solution for three days to get functionalized. Alternatively, the precursor polymer could be dissolved in a polar solvent such as DMSO, DMF, DMAc, then a QA compound ethanol solution was added to the polymer solution for running for three days at room temperature. The homogenously functionalized polymer was precipitated by pouring the solution into diethyl ether.

The synthesis of the starting monomer for the polymerization of the precursor polymer shown in formula (15P3-3) was referred by a published method, which was that for example 1 eq of 1-Methyl-4-piperidone, 2.1 eq of phenol and deionized water were added together and stirred in an argon atmosphere. After the reaction system was cooled to 0° C., sulfuric acid was carefully added dropwise into the solution and kept stirring at room temperature for a desired time monitored by TLC. The oily viscous mixture was diluted by adding hot acetone/methanol and transferred into a breaker. The resulting solution was neutralized by addition of 0.5 M $Na_2CO_3$, subsequently added ice to the white powder to completely precipitate. The product in sulfate form was further recrystallized from deionized water before drying, to obtain a white product.

Example 15P3-2: Polymerization and Functionalization of the Precursor Polymer Shown in Formula (15P3-3)

Figure 10:
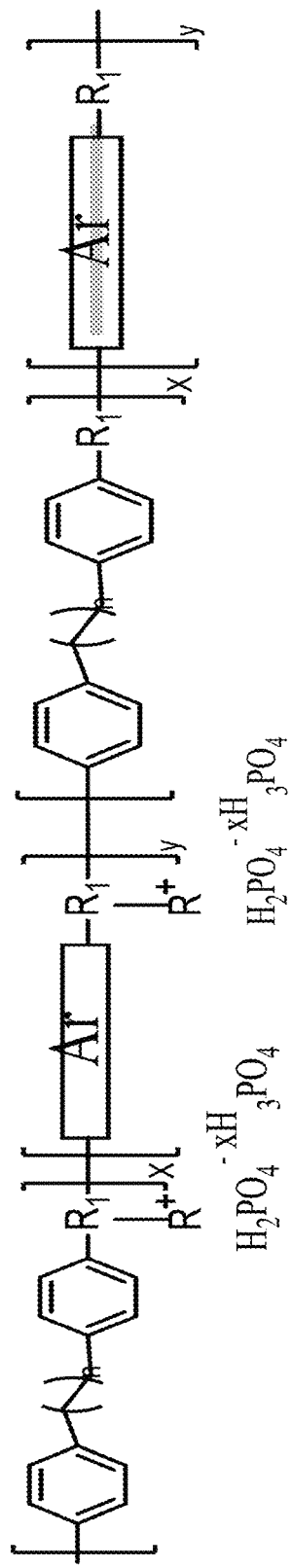
FIG. 10 shows a polymer diagram for polyphenylene wherein Ar is the polyphenylene component, R1 is the spacer which can be functionalized and R is the functional group which can be ion paired with phosphoric acid.

For the polymerization, 1.0 eq of the monomer synthesized above, 1.3 eq 2,2,2-trifluoroacetophenone were mixed in dichloromethane, then a desired amount of trifluoromethanesulfonic acid was added dropwise to the solution. The reaction was running at room temperature for 2 hours before diluting with DMSO and then pouring the mixture into diethyl ether. The obtained polymer was washed by hot water three times. After the polymer is dried, the polymer was dissolved in a polar solvent with iodomethane and stirring for 48 hours before pouring the polymer solution into non-polar solvent to get functionalized ionomer FIG. 10 shows a polymer diagram having a polyphenylene backbone wherein Ar is the polyphenylene backbones. The ionomers shown in formula (20P-1) and (20P-2) are prepared by superacid catalytic polymerization. In one embodiment, a membrane with the structure shown in formula (1) and the spacer shown in structure (20P-1) as well as formula (20P-2) are prepared by dissolving the precursor polymer in toluene at a 10% weight ratio i.e. 0.25 grams of polymer to 2.50 g of solvent. The mixture was stirred until homogenous and translucent.

The precursor polymer solution was then applied to a microporous polyethylene material tensioned around a chemically resistant plastic frame. The polymer solution was then poured on to the microporous scaffold. The frame was covered with a lid to slow solvent evaporation. The membrane was dried at room temperature. The final thickness of the precursor membrane was 5 micrometers.

In another embodiment, a membrane is prepared by dissolving the precursor polymer in toluene at a 5% weight ratio i.e. 0.3 grams of polymer to 5.7 g of solvent. The mixture was stirred until homogenous and translucent.

The precursor polymer was then applied to a microporous poly(tetrafluoroethylene) material with a doctor blade. The precursor polymer membrane was covered with a lid to slow solvent evaporation. The membrane was dried at room temperature. The final thickness of the membrane was 15 microns.

In one embodiment, a membrane shown in formula (20P-1) and with the spacer structure (20P-2) is prepared by dissolving the precursor polymer in polar solvent such as DMSO, NMP, DMF, DMAc at a 10% weight ratio i.e. 0.25 grams of polymer to 2.50 g of solvent. The mixture was stirred until homogenous and translucent.

The precursor polymer solution was then applied to a microporous polyethylene material tensioned around a chemically resistant plastic frame. The polymer solution was then poured on to the microporous scaffold. The frame was covered with a lid to slow solvent evaporation. The membrane was dried at room temperature. The final thickness of the precursor membrane was 5 micrometers.

In another embodiment, a membrane is prepared by dissolving the precursor polymer in polar solvent such as DMSO, NMP, DMF, DMAc at a 5% weight ratio i.e. 0.3 grams of polymer to 5.7 g of solvent. The mixture was stirred until homogenous and translucent.

The precursor polymer was then applied to a microporous poly(tetrafluoroethylene) material with a doctor blade. The precursor polymer membrane was covered with a lid to slow solvent evaporation. The membrane was dried at room temperature. The final thickness of the membrane was 15 microns It will be apparent to those skilled in the art that the latter embodiment can be scaled up to a roll-to-roll, continuous process.

In the case of either embodiment, multiple coatings can be applied to increase the membrane thickness or to facilitate filling of the porous material.

In the case of either embodiment, the precursor polymer membrane can be functionalized chemically or soaked in trimethylamine solution in water or ethanol to convert the haloalkyl moieties within the precursor polymer to a trialkyl ammonium head-group enabling anion conduction within the membrane. The mobile halogen counter ion (e.g. bromide, chloride or iodide) can later be exchanged with hydroxide ions.

Optionally, the precursor polymer membrane can contain or be soaked in a diamine, such as tetramethyl hexyldiamine, to cross-link some or all of the haloalkyl moieties. The cross-linking is preferably carried out before the amination reaction in trimethylamine; however, cross-linking may also be carried out after amination.

Polymers compatible with porous scaffold embedded into it. The polymers consisted of an all-hydrocarbon polymer backbone which was chemically stable polymer even under harsh working conditions, such as 80° C. in 1 M NaOH. Efficient ion channels were engineered into the AEM by synthesis of a block copolymer. The block copolymer was composed of at least two blocks: hydrophilic ones which were functionalized with tethered cation groups for anion conduction, and hydrophobic ones to facilitate phase segregation of the polymer so as to form efficient anion conductive channels In addition to forming efficient ion conducting channels within the AEM material by itself, the AEM/scaffold composite has lower water uptake and is structurally more robust than the neat AEM polymer. Control over excess water uptake is a critical parameter is AEM applications. In addition, the poly(phenylene) polymer used here is compatible and sufficiently adherent to the scaffold to form a reliable integrated structure. The high intrinsic mechanical compliance and toughness of the poly(phenylene) AEM allows the use of very thin scaffolds resulting in composites which have very low area specific resistance and water uptake.

The syntheses of the two spacers shown in structure (20P-1) and (20P-2) are followed by literature method. Briefly for the spacer shown in structure 1, $AlCl_3$ was suspended in dichloromethane, then the mixture of trifluoroacetic anhydride and bromo-phenyl alkane were added to the solution and stirred for a desired period. The product shown in the structure 1 was extracted and purified through chromatography after completion of the reaction. For the side chain shown in structure 20P-2, 1,6-dibromohexane and N-methylpiperidine were reacting in acetone for 24 hours, the resulting white powder was washed three times with acetone without any other purification.

Details of a process for synthesizing the target ionomer shown in the FIG. 10 and are further described in Example 20P-1. The syntheses of the other co-polymeric component ratios are following a similar general procedure as described below.

Example 20P-1: Synthesis of the Precursor Anion Conductive Polymer for the Phosphoric Acid Doping Ion Pair Ion Exchange Membrane Shown in FIG. 10

For the synthesis, a 250 ml three-neck flask was added with a mixture of aromatic component (1.0 eq), diphenyl alkane (33% eq) and one of the spacer compounds shown in structure (20P-1) or (20P-2) (1.8 eq). The mixture was dissolved and stirrer in dichloromethane until the solution was clear. Then, trifluoracetic acid and triflic acid were added to the solution with a ratio of 1:2 and the mixture was stirrer under room temperature for 24 h until the mixture was viscous. Then, the mixture solution was poured into cold water and the resulting white precipitation was filtered out and washed with acetone and methanol for three times. After drying the resulting polymer under vacuum oven at higher temperature, the polymer was dissolved in DMSO and potassium carbonate was added to the mixture with 1-(6-Bromohexyl)-1-methylpiperidinium synthesized by following literature method. After 48 hours, the mixture was poured into acetone to obtain the precursor ionomer. The membrane was prepared by solution casting. N-piperidinium may include a functional group of methyl, ethyl or any other organic group.

Details of a process for preparing the final phosphoric acid doped ion pair ion exchange membrane based on the starting anion exchange polymer with a structure shown in the FIG. 10 and are further described in Example 20P-2.

Example 20P-2

The preparation of phosphoric acid doped ion pair ion exchange membrane was conducted in 85 wt % phosphoric acid. The precursor exchange membrane prepared above was soaked in NaOH solution for 12 hours in order to convert the starting anion exchange membrane from $Br^-$ to $OH^-$ form. After that, the membrane was transferred and soaked in 85 wt % phosphoric acid for 12 hours. Then the phosphoric acid doped ion exchange membrane was taken out of the phosphoric acid bath for drying for 72 hours.

Figure 11:
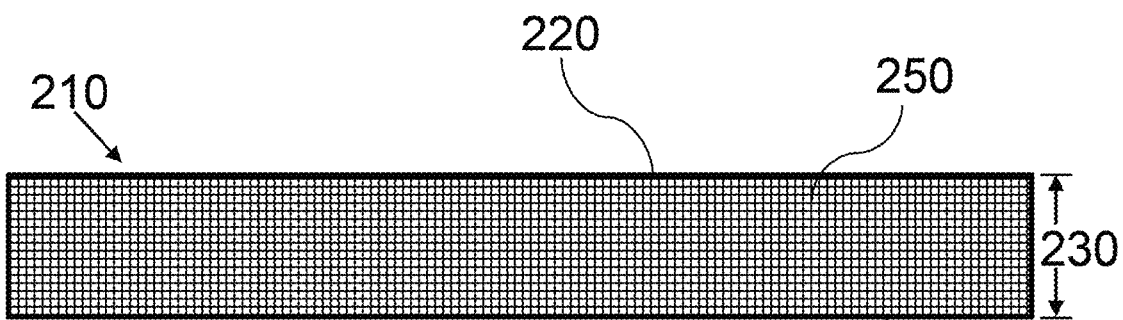
FIG. 11 shows a cross sectional view of an exemplary porous scaffold reinforcement material employed in the present invention.
Figure 12:
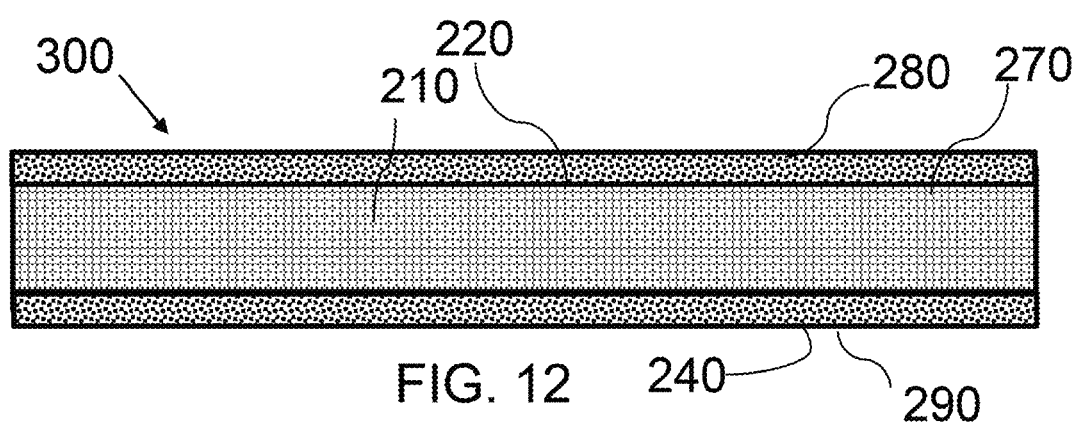
FIG. 12 shows a cross sectional view of an exemplary precursor polymer membrane formed from imbibing a precursor polymer into a porous scaffold reinforcement material.
Figure 13:
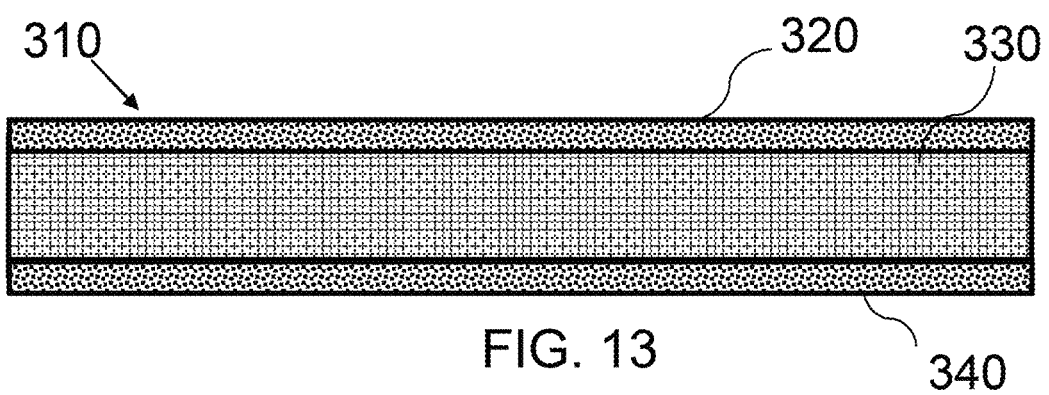
FIG. 13 shows a cross sectional view of an exemplary anion exchange membrane formed from treating the precursor polymer membrane of FIG. 2 with trimethylamine.

Referring now to FIG. 11 to FIG. 13. As shown in FIG. 11, an exemplary porous scaffold 10 has a thickness 230 from a first side 220 and an opposite second side 240. The porous scaffold has pores 250 and an open structure extending from the first side 220 to the second side 240, allowing for a flow of appropriate fluid from the first to the second side. The porous scaffold is air permeable when not imbibed with another solid material.

FIG. 12 shows a cross-sectional diagram of a composite precursor polymer membrane 300 comprising a porous scaffold 210 imbibed with a precursor polymer 270 which contains chemical moieties capable of forming fixed cation head-groups thereon. The precursor polymer forms surface layers 280 and 290 on the first side 220 and an opposite second side 240, respectively, of the porous scaffold shown in FIG. 11.

Polymers compatible with porous scaffold embedded into it. The polymers consisted of an all-hydrocarbon polymer backbone which was chemically stable polymer even under harsh working conditions, such as 80° C. in 1 M NaOH. Efficient ion channels were engineered into the AEM by synthesis of a block copolymer. The block copolymer was composed of at least two blocks: hydrophilic ones which were functionalized with tethered cation groups for anion conduction, and hydrophobic ones to facilitate phase segregation of the polymer so as to form efficient anion conductive channels In addition to forming efficient ion conducting channels within the AEM material by itself, the AEM/scaffold composite has lower water uptake and is structurally more robust than the neat AEM polymer. Control over excess water uptake is a critical parameter is AEM applications. In addition, the poly(phenylene) polymer used here is compatible and sufficiently adherent to the scaffold to form a reliable integrated structure. The high intrinsic mechanical compliance and toughness of the poly(phenylene) AEM allows the use of very thin scaffolds resulting in composites which have very low area specific resistance and water uptake.

FIG. 13 shows a cross-sectional diagram of a composite anion exchange membrane 310 formed after treating the precursor polymer membrane 100 with trimethylamine, forming the fixed cation head groups. The leaving groups of the precursor polymer 270 have been replaced with quaternary ammonium functional groups, producing an anion conductive (exchange) polymer 330 which is sufficiently imbibed in the porous scaffold 320. The anion exchange polymer may be fully imbibed into the porous scaffold, Optionally, the precursor polymer could be cross-linked before or after amination, or not at all. The composite anion conductive polymer forms surface layers 320 and 340 on the two sides or surfaces of the imbibed porous scaffold.

The starting polymer is prepared by superacid catalytic polymerization. The precursor polymer solution was then applied to a microporous polyethylene material tensioned around a chemically resistant plastic frame. The polymer solution was then poured on to the microporous scaffold. The frame was covered with a lid to slow solvent evaporation. The membrane was dried at room temperature. The final thickness of the precursor membrane was 5 micrometers.

The starting polymer was then applied to a microporous poly(tetrafluoroethylene) material with a doctor blade. The starting polymer membrane was covered with a lid to slow solvent evaporation. The membrane was dried at room temperature. The final thickness of the membrane was 15 microns.

The precursor polymer was then applied to a microporous poly(tetrafluoroethylene) material with a doctor blade. The precursor polymer membrane was covered with a lid to slow solvent evaporation. The membrane was dried at room temperature. The final thickness of the membrane was 15 microns It will be apparent to those skilled in the art that the latter embodiment can be scaled up to a roll-to-roll, continuous process.

In the case of either embodiment, multiple coatings can be applied to increase the membrane thickness or to facilitate filling of the porous material.

In the case of either embodiment, the precursor polymer membrane can be functionalized chemically with phosphonate group Optionally, the precursor polymer membrane can contain or be soaked in a diamine, such as tetramethyl hexyldiamine, to cross-link some or all of the haloalkyl moieties. The cross-linking is preferably carried out before the amination reaction in trimethylamine; however, cross-linking may also be carried out after amination.

Figure 14:
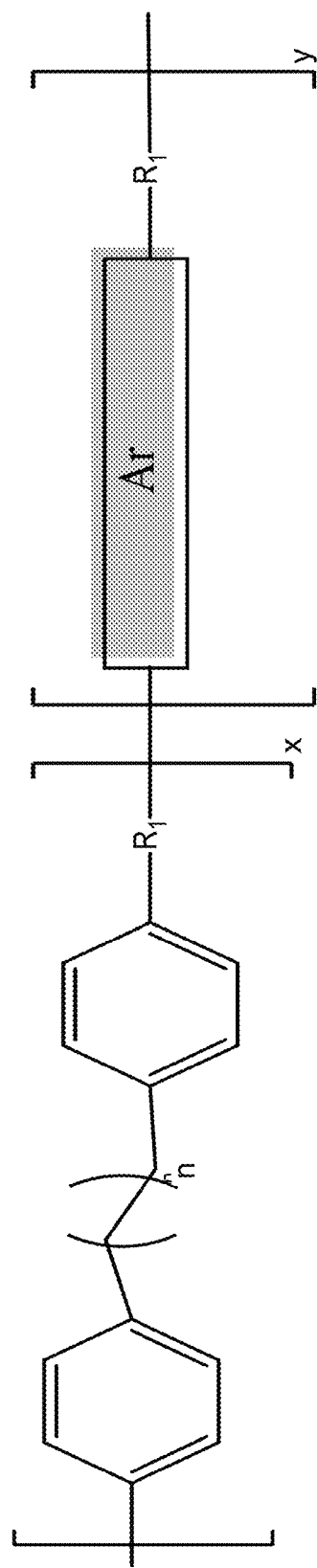
FIG. 14 shows a polymer diagram for polyphenylene wherein Ar is the polyphenylene component, 24P-R1 is one of the spacers selected from Structure (24P-1) and (24P-2)) which can be phosphorylated.
Figure 15:
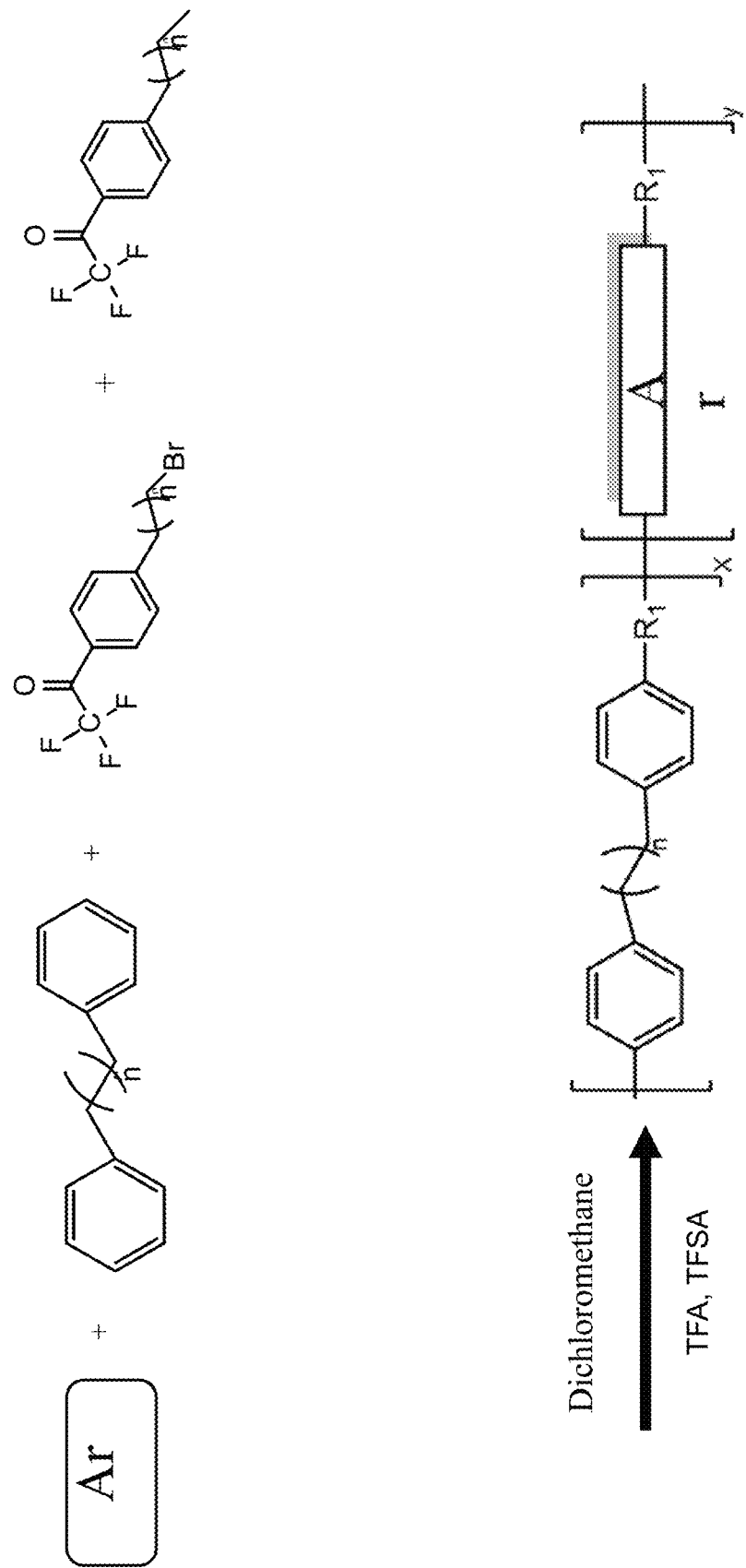
FIG. 15 is the synthetic pathways for the starting co-polymer shown in formula 1.
Figure 18:
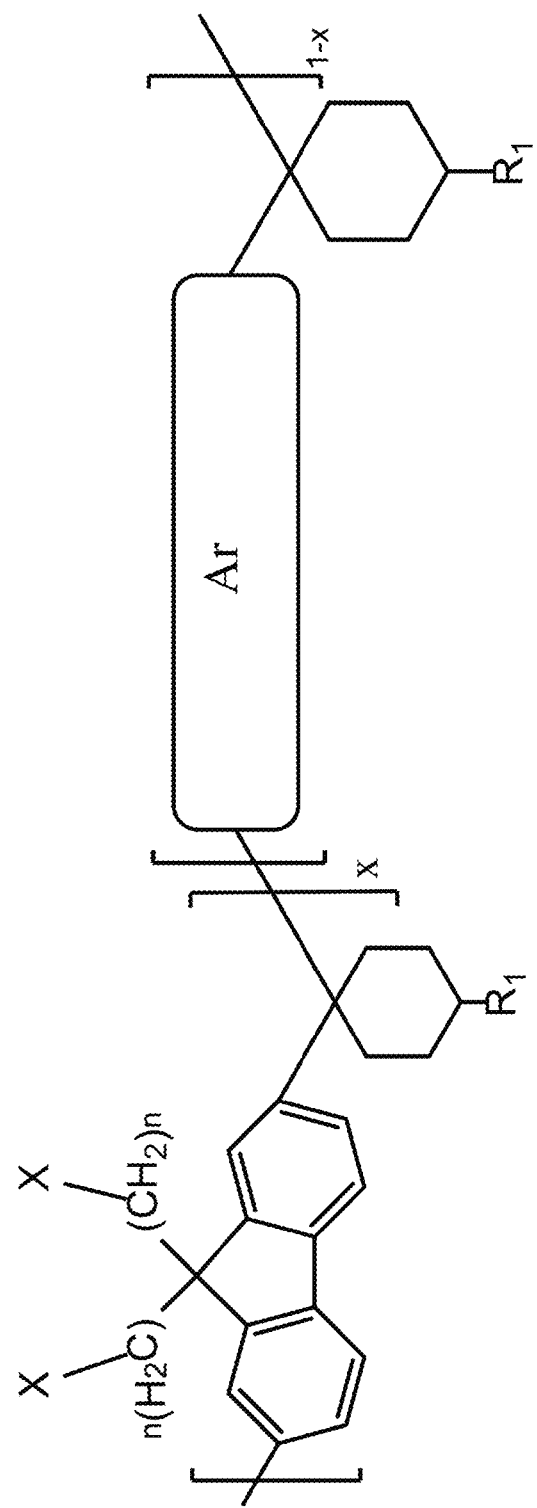
FIG. 18 shows a polymer diagram for fluorene-based polyphenylene wherein Ar is the polyphenylene component, R1=H, alkyl, aryl.
Figure 19:
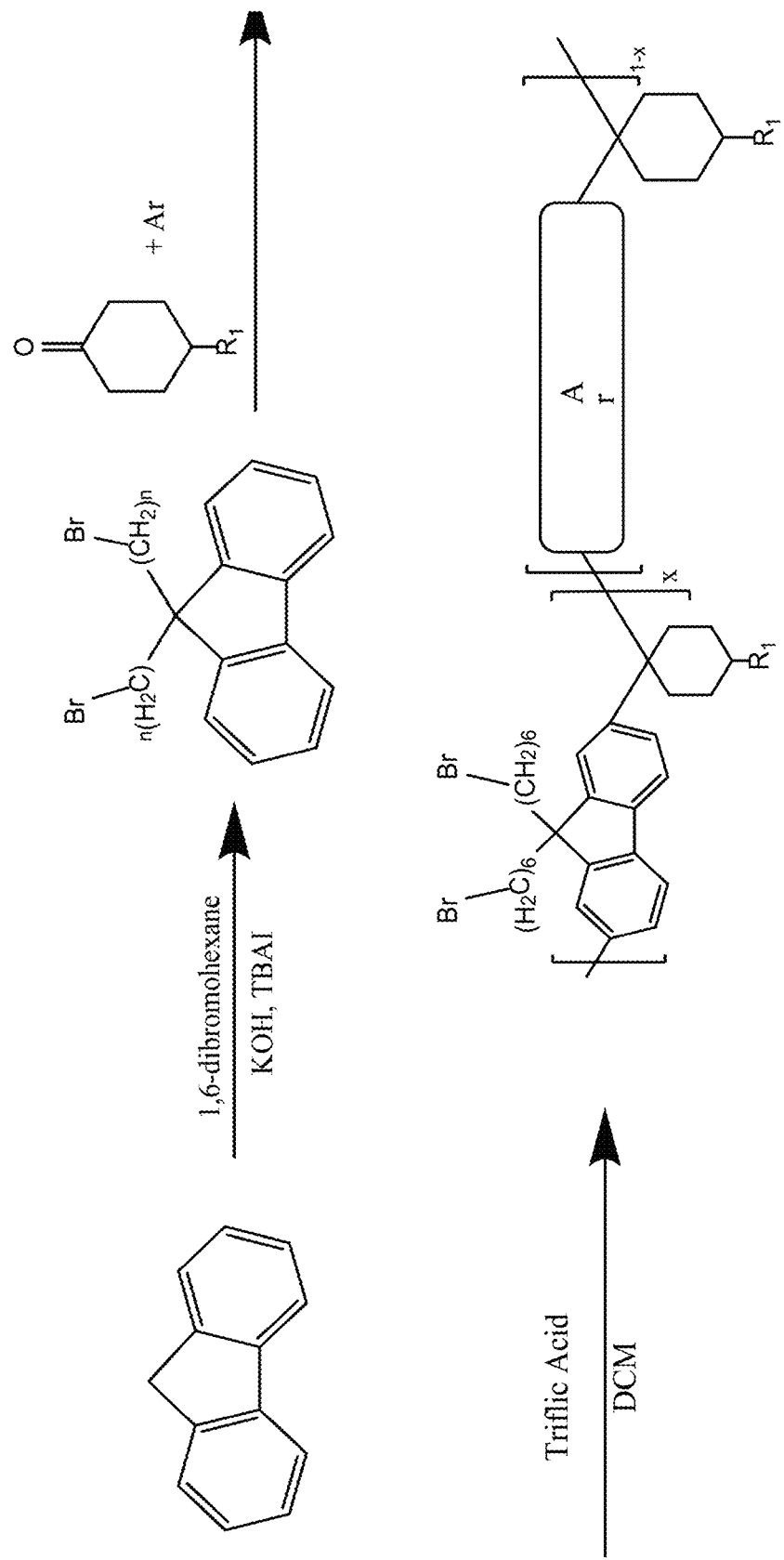
FIG. 19 is the synthetic pathways for the starting co-polymer shown in formula 24P-2.
Figure 20:
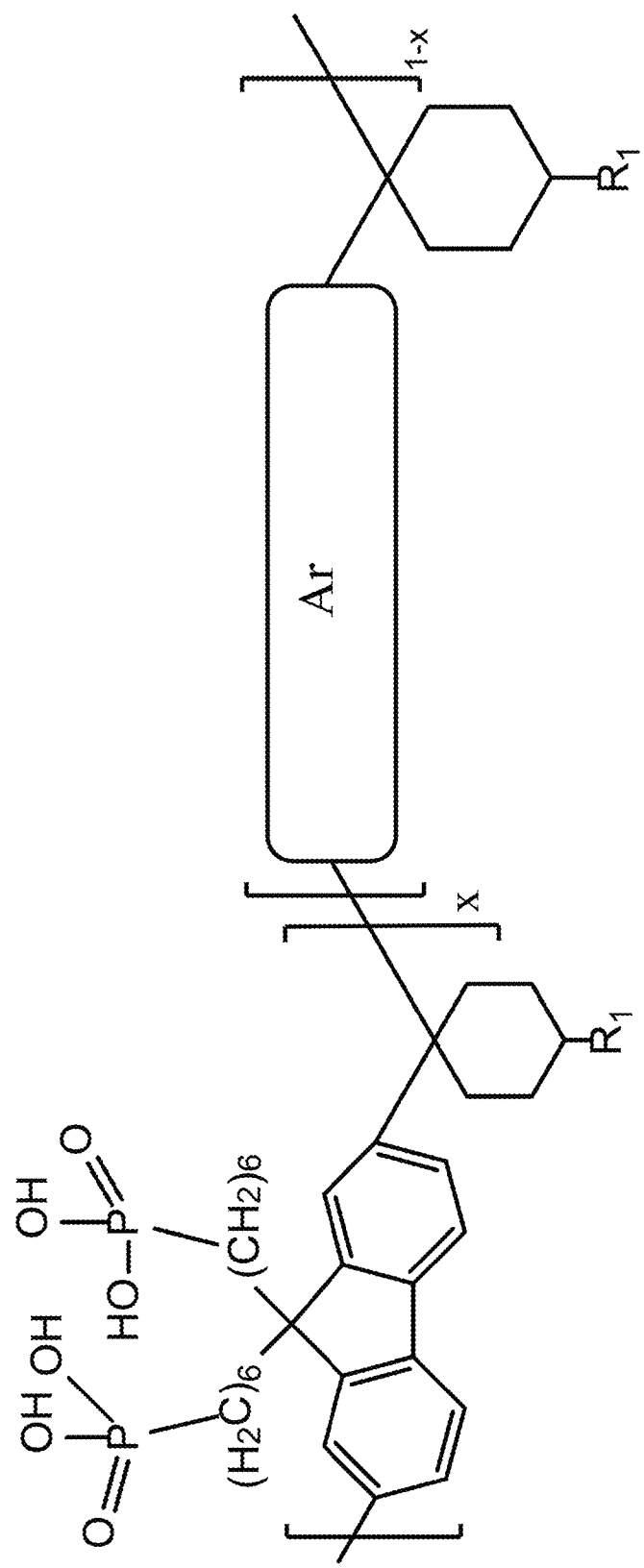
FIG. 20 is the chemical structure of covalently phosphoric acid doping polymer based on the structure of formula.

FIGS. 14 and 18 show a starting polymer diagram having a polyphenylene backbone wherein Ar is the polyphenylene backbones Referring to FIGS. 15 and 19, according to one embodiment, a synthetic route and a composition are disclosed. The polymer is produced by reaction of compounds including poly(phenylene) and polyfluorene that form the backbone of the polymer.

The syntheses of the spacers are followed by literature method. Briefly for the spacer shown in structure 1, $AlCl_3$ was suspended in dichloromethane, then the mixture of trifluoroacetic anhydride and bromo-phenyl alkane were added to the solution and stirred for a desired period. The product shown in the structure 1 was extracted and purified through chromatography after completion of the reaction.

Details of a process for synthesizing the target ionomer shown in the FIG. 14 and are further described in Example 24P-1. The syntheses of the other co-polymeric component ratios are following a similar general procedure as described below.

Example 24P-1: Synthesis of the Starting Anion Conductive Polymer Shown in FIG. 14

For the synthesis, a 250 ml three-neck flask was added with a mixture of aromatic component (1.0 eq), 9,9-Dialkanexanthene with twisted structure (33% eq) and the diphenyl alkane (33% eq) and one of the spacer compounds (1.8 eq). The mixture was dissolved and stirrer in dichloromethane until the solution was clear. Then, trifluoracetic acid and triflic acid were added to the solution with a ratio of 1:2 and the mixture was stirrer under room temperature for 24 h until the mixture was viscous. Then, the mixture solution was poured into cold water and the resulting white precipitation was filtered out and washed with acetone and methanol for three times. After drying the resulting polymer under vacuum oven at higher temperature, the polymer was dissolved in DMSO and potassium carbonate was added to the mixture with 1-(6-Bromohexyl)-1-methylpiperidinium synthesized by following literature method. After 48 hours, the mixture was poured into acetone to obtain the target ionomer shown in FIG. 14.

Figure 16:
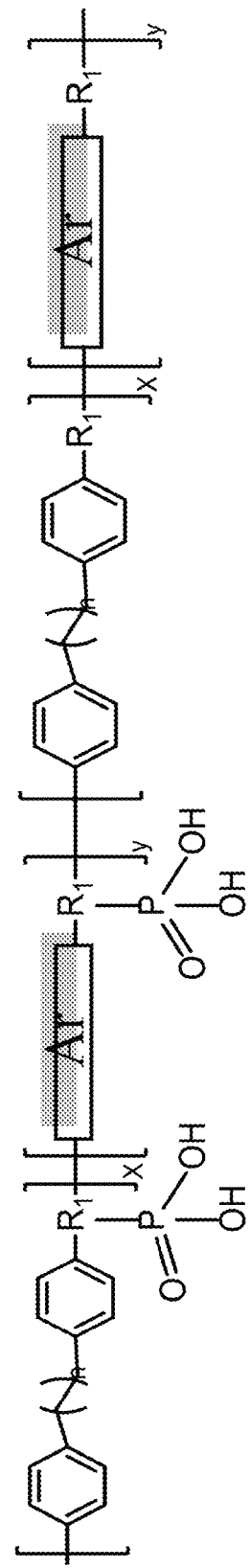
FIG. 16 is the chemical structure of target phosphonate-based ion pair exchange membrane.
Figure 17:
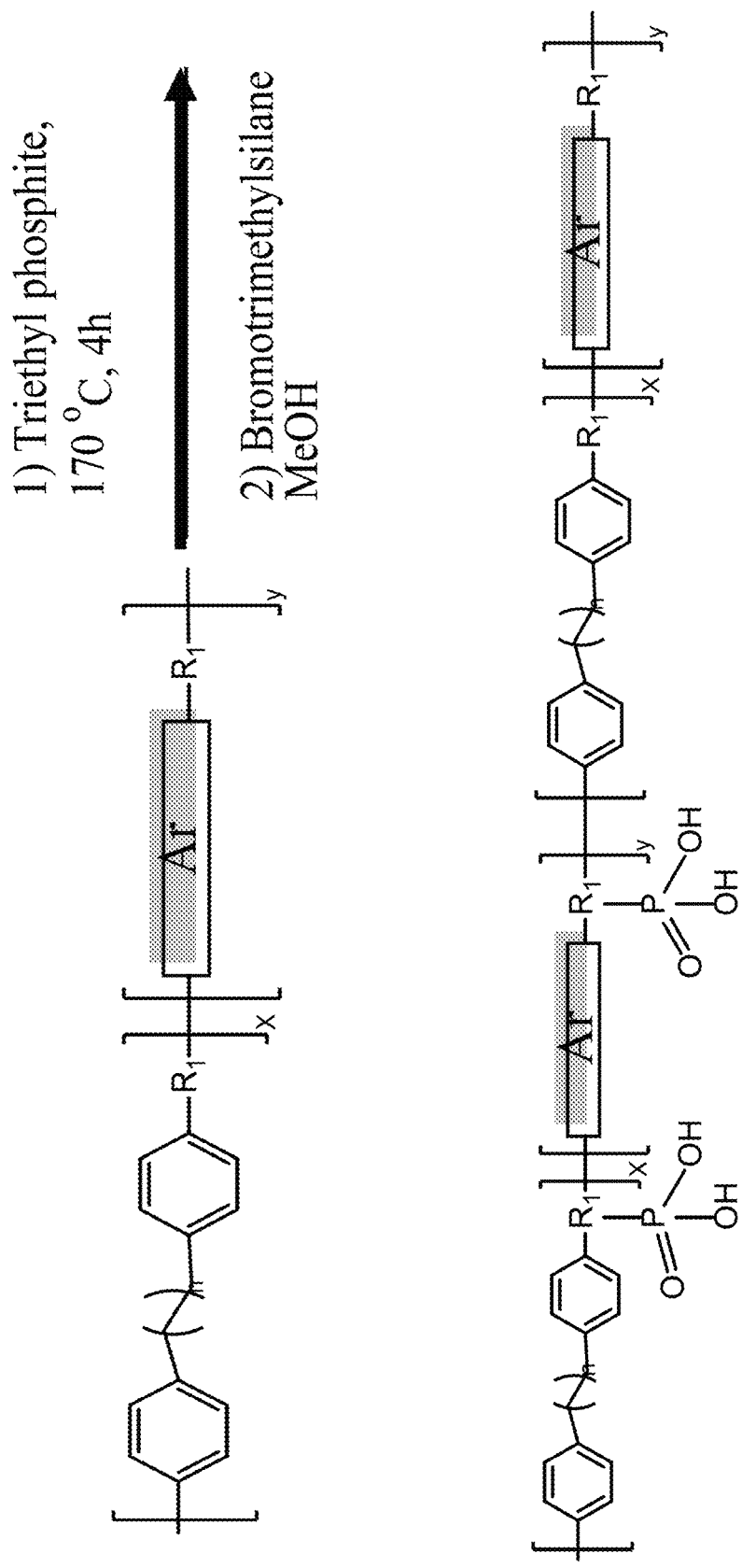
FIG. 17 is the synthetic pathways for phosphorylation of the starting co-polymer.

Details of a process for preparing covalently bonding phosphoric acid ion pair ion exchange membrane shown in FIG. 16 based on the starting co-polymer with a structure shown in the FIG. 14 and are further disclosed in FIG. 17 and described in Example 2

Example 24-2

The starting co-polymer was dispersed in triethyl phosphite and refluxed at 170° C. for 4 hours under inert atmosphere. Excessive triethyl phosphite was evaporated under reduced pressure. To the obtained solid was added dichloromethane and bromotrimethylsilane dropwise. The resulting solution was stirred for 12 hours at room temperature after the addition. The solvent then was removed and methanol was added to the mixture for keeping stirring for 12 hours. Removing the methanol and washing the resulting polymer solid with water for three times.

Details of a process for synthesizing the target ionomer shown in the FIG. 18 and are further described in Example 24P-1. The syntheses of the other co-polymeric component ratios are following a similar general procedure as described below. The monomer 9,9-Bis(6-bromohexyl)-9H-fluorene was synthesized according to published method.

Example 24P-3: Synthesis of the Starting Anion Conductive Polymer Shown in FIG. 18

For the synthesis, a 100 ml three-neck flask was added with a mixture of 9,9-Bis(6-bromohexyl)-9H-fluorene (2.4 g, 4.88 mmol, 1.0 eq), aromatic compound selected from the structure 3 (0.5%-1.5% eq), alkylcyclohexanone (1.2 eq), 8 ml trifluoromethanesulfonic acid, 2 ml trifluoracetic acid in 8 ml dichloromethane under argon. The mixture was running at room temperature for 7-12 h until the mixture is viscous. Then, the mixture solution was poured into cold methanol and white precipitation was obtained through vacuum filtration. After washing the solids with hot methanol and water, the aqueous solution containing trimethylamine was added with the solids and stirred at room temperature for overnight. The target ionomer was obtained after vacuum filtration and washing with water.

Figure 21:
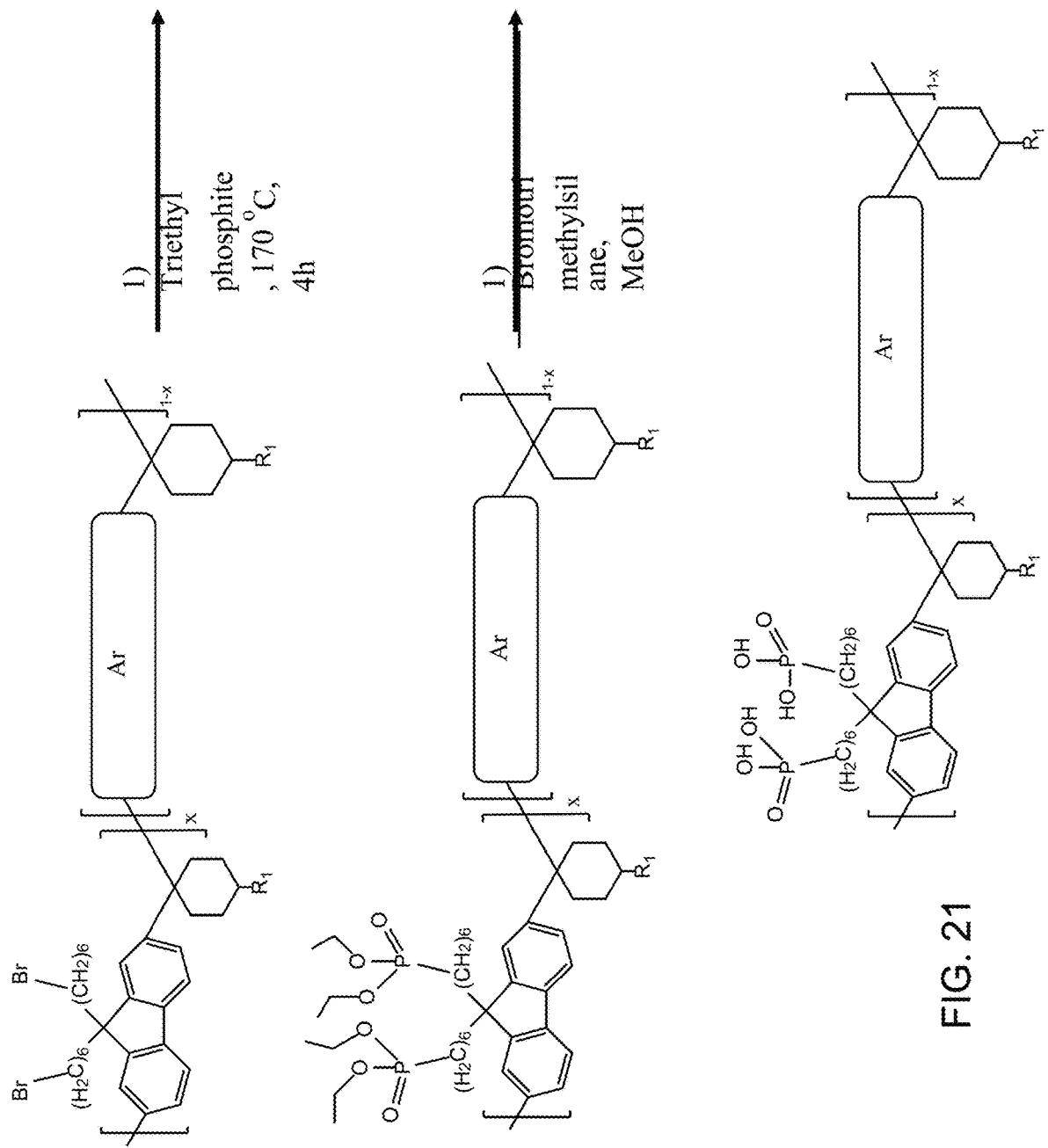
FIG. 21 is the synthetic pathways for phosphorylation of the polymer shown in formula.

Details of a process for preparing covalently bonding phosphoric acid ion pair ion exchange membrane shown in FIG. 16 based on the starting co-polymer with a structure shown in the FIG. 18 and are further disclosed in FIG. 21 and described in Example 24P-2.

Example 24P-4

The polymer synthesized from the example 3 was dispersed in triethyl phosphite and refluxed at 170° C. for 4 hours under inert atmosphere. Excessive triethyl phosphite was evaporated under reduced pressure. To the obtained solid was added dichloromethane and bromotrimethylsilane dropwise. The resulting solution was stirred for 12 hours at room temperature after the addition. The solvent then was removed and methanol was added to the mixture for keeping stirring for 12 hours. Removing the methanol and washing the resulting polymer solid with water for three times.

It will be apparent to those skilled in the art that various modifications, combinations, and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An ion conducting polymer comprising:
   a) a backbone comprising poly(aryl) and a branching compound;
      wherein poly(aryl) comprises: a copolymer of polyphenylene and polyxanthene;
      wherein the branching compound has two or more benzene rings, each with a bonding site;
   b) side chains including first side chains that are functionalized including N-heterocyclic side chains;
   c) functional groups comprising a N-heterocyclic side chains including quinuclidinium, wherein the functional groups are bonded to said first side chains including functional sites each including a charged compound.

2. The ion conducting polymer of claim 1, wherein the first side chains comprise N—N-piperidinium.

3. The ion conducting polymer of claim 1, wherein the first side chains comprise poly(aryl) comprising quinuclidinium.

4. The ion conducting polymer of claim 1, wherein the branching compound is 1,3,5-triphenylbenzene.

5. The anion conducting polymer of claim 1, further comprising second side chains selected from the group consisting of hydrogen, alkyl, alkylene, alkynyl, cycloalkylene, arylene and trifluoromethyl (CF3).

6. The anion conducting polymer of claim 1, wherein the functional groups include a compound selected from the group consisting of alkyl, alkylene, and alkynyl, aryl.

7. The anion conducting co-polymer of claim 1, further comprising second side chains comprising trifluoromethyl (CF3).

8. The ion conducting polymer of claim 1, further comprising second side chains comprising trifluoroalkyl side chains.

9. The ion conducting polymer of claim 1, further comprising second side chains comprising alkylated phenyl side chains.

10. The anion conducting polymer of claim 1, wherein a mol percent of the functionalized side chain to a non-functionalized side chain is 1:1 to 1:0.

11. The anion conducting polymer of claim 1, wherein the anion conducting co-polymer is crosslinked by a crosslinker compound.

12. The anion conducting polymer of claim 11, wherein the crosslinker compound comprises a halogenated compound.

13. The anion conducting polymer of claim 11, wherein the crosslinker compound is selected from the group consisting of alkyl, alkylene, alkynyl, and aryl.

14. The ion conducting polymer of claim 1, wherein the ion conductive polymer further comprises an additive selected from a group consisting of radical scavengers, plasticizers, fillers, anion conducting material, and crosslinking agent.

15. The ion conducting polymer of claim 14, wherein the radical scavenger is an antioxidant selected from the group consisting of cerium (Ce), manganese (Mn), phenolic compounds, nitrogen-containing heterocyclic compounds, quinones, amine, phosphites, phosphonites, and thioesters.

16. The ion conducting polymer of claim 1, wherein anion exchange membrane comprises multiple layers anion conductive polymer.

17. The ion conducting polymer of claim 1, further comprising a free radical inhibitor selected from the group consisting of inorganic free radical scavenger metal organic frameworks (MOF) including cerium oxides and metal oxide.

18. The anion conducting co-polymer of claim 17, wherein a mole ratio between free radical inhibitor and the anion conducting co-polymer is between 0.01:1 to 1:0.1.

19. The anion conducting polymer of claim 1, further comprising a free radical inhibitor selected from the group consisting of phenols, hindered phenols, quinone and phosphite.

20. The anion conducting polymer of claim 19, wherein the free radical inhibitor includes a primary free radical inhibitor of phenol, hindered phenol or quinone;
wherein the primary free radical inhibitor is configured to inhibit free radical generation during electrochemical operation of the ion exchange membrane;
wherein the free radical inhibitor includes a secondary free radical of phosphite; and
wherein the secondary free radical inhibitor inhibits free radicals generation during electrochemical operation of the ion exchange membrane.

21. The anion conducting polymer of claim 20, wherein a molar ratio of the primary and secondary free radical inhibitors is in the range of 1:0.1 to 1:1.

22. An anion exchange membrane comprising:
a) the anion conducting polymer of claim 1;
wherein the anion exchange membrane is a thin sheet of material having a thickness of less than 200 μm.

23. The anion exchange membrane of claim 22, further comprising:
a) a support layer;
wherein the anion conducting co-polymer extends through the support layer from a first side to a second side of the support layer to produce a composite anion exchange membrane.

24. The anion exchange membrane of claim 23, wherein the composite anion exchange membrane has a thickness of no more than 50 μm.

* * * * *